US011044247B2

(12) United States Patent
Lee et al.

(10) Patent No.: US 11,044,247 B2
(45) Date of Patent: *Jun. 22, 2021

(54) SYSTEMS AND METHODS FOR AUTHENTICATION USING AUTHENTICATION MANAGEMENT SERVER AND DEVICE APPLICATION

(71) Applicants: Michael Dong Lee, Singapore (SG); Jenny Jee-Young Park, Singapore (SG)

(72) Inventors: Michael Dong Lee, Singapore (SG); Jenny Jee-Young Park, Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 16/804,172

(22) Filed: Feb. 28, 2020

(65) Prior Publication Data
US 2020/0204543 A1   Jun. 25, 2020

Related U.S. Application Data

(63) Continuation-in-part of application No. 16/125,706, filed on Sep. 9, 2018.

(60) Provisional application No. 62/564,281, filed on Sep. 28, 2017.

(51) Int. Cl.
*H04L 29/06* (2006.01)

(52) U.S. Cl.
CPC ........ *H04L 63/0853* (2013.01); *H04L 63/083* (2013.01); *H04L 63/0876* (2013.01); *H04L 63/101* (2013.01); *H04L 63/102* (2013.01)

(58) Field of Classification Search
CPC .................................................. H04L 63/0853
See application file for complete search history.

(56) References Cited

U.S. PATENT DOCUMENTS

| 5,671,354 | A | 9/1997 | Ito et al. | |
|---|---|---|---|---|
| 2004/0230968 | A1* | 11/2004 | Masunaga | H04L 29/06 717/171 |
| 2007/0078782 | A1* | 4/2007 | Ono | G06Q 20/3674 705/67 |
| 2007/0204332 | A1* | 8/2007 | Pan | G06F 21/71 726/5 |
| 2007/0226783 | A1* | 9/2007 | Mimlitsch | H04L 63/0815 726/4 |
| 2008/0283595 | A1* | 11/2008 | Kimura | G06F 21/62 235/380 |
| 2019/0065704 | A1* | 2/2019 | Giffard-Burley | G06F 21/31 |
| 2019/0098009 | A1* | 3/2019 | Lee | H04L 63/108 |

* cited by examiner

*Primary Examiner* — Simon P Kanaan
(74) *Attorney, Agent, or Firm* — BakerHostetler

(57) ABSTRACT

Systems and methods for authenticating a user for a service provider system. A request to authenticate a user is received from a service provider system in an authentication management system. An authentication request is transmitted from the authentication management system to a registered device associated with the user. An authentication confirmation is received from the registered device in the authentication management system. An authentication verification is provided to the service provider system in response to receiving the authentication confirmation.

21 Claims, 32 Drawing Sheets

SYSTEMS AND METHODS FOR AUTHENTICATION USING AUTHENTICATION MANAGEMENT SERVER AND DEVICE APPLICATION

CROSS-REFERENCED APPLICATIONS

This Application is a Continuation-In-Part Application of co-pending U.S. patent application Ser. No. 16/125,706 filed Sep. 9, 2018 that in turn claims priority to U.S. Provisional Patent Application 62/564,281 filed Sep. 28, 2017. Both of these applications are hereby expressly incorporated by reference as if set forth herewith for all reasons.

FIELD OF THE INVENTION

The present disclosure relates to systems and methods for authentication using an authentication management server and its accompanying device application installed on a user's device. More particularly, the present disclosure relates to systems and methods of exchanging sensitive data between a service provider and a user.

BACKGROUND

Traditional password-based systems and methods for authentication of a user have many problems. Due to these problems a user's password became less reliable and some service providers, especially financial institution's, often require additional layers of authentication such as "one time password" which is sent to a user's device or email, "token" that generates random password which must be copied and re-entered, etc. These multi-factor authentication methods to remedy problems and enhance security are often burdensome and inconvenient.

Other types of development have been unsuccessful. For example, random password generator has not been effective because it generates 'random' password which most users cannot possibly remember. Recently, biometric data is often used as an authentication credential to unlock various devices but using a user's biometric data as an authentication credential for other services is not without some drawbacks. Additionally, an idea that a service provider or a third party may possess a user's unique biometric data as an authentication credential may not get necessary public support because of security and privacy concern and the fact that biometric data cannot be changed or reset if a service provider's system, a third party's system or a data itself is compromised or otherwise changing the authentication credential becomes necessary.

When it comes to authentication, convenience and security always have had negative correlation forcing a service provider and a user to constantly balance the two and compromise one over the other. The above information is provided as background information only to assist with an understanding of the present disclosure. No determination has been made, and no assertion is made, as to whether any of the above might be applicable as prior art with respect to the present disclosure.

SUMMARY

The present disclosure provides, among other things, novel methods and systems of authenticating a user with a service provider using an authentication management server along with its accompanying cross-platform device application installed on a user's device. The systems and methods of the present disclosure provide significant convenience and increased transaction security for a user and a service provider by supplementing or eliminating the need for a typical password-based authentication process.

According to aspects of the inventions, an authentication management server system may enable a user to securely log into and/or transact with a service provider by providing a secure and seamless exchange of sensitive data between a user and the service provider whether a user is using his own device on a secure network or a public device on an unsecured public network. For a service provider, an authentication management server may relay its various requests for specific actions or information previously stored by the user to the user and securely relay back authenticated approvals and/or corresponding information from the user. For a user, an authentication management server can create, store, manage and/or securely transmit a user's personal information including passwords to a service provider upon the user's express instruction to do so.

As an illustrative example for the above aspect, an authentication management server system may function as a verified and trusted escrow system between a service provider and a user that securely transmits approvals for various requests a service provider requires only upon express consent by an authorized user. An authentication management server may further function as a personal data management system which assists a user to create, store and manage the user's sensitive personal data, including passwords, and transmits necessary information when requested by a service provider on behalf of a user only upon express consent by an authorized user. A user would be able to monitor & review all transactions associated with his ID prior to authorizing such transactions. Further, a user would not have to create, store, remember or enter any password to log-in or execute a transaction. A service provider and a user can securely interact with each other without the need for traditional password-based authentication, two-factor authentication method to log the user in or traditional OTP method to execute a specific transaction.

Aspects of the invention may also provide for a device to device authentication method where a user can register additional devices by installing an approval app under the same user ID on other devices for convenience or as a recovery or authentication device for added security without a password. A traditional method of authenticating and registering additional devices for many cloud-based servers and its mobile device application involves a user ID and a password. A device to device authentication method may use at least one registered device to authorize and register a new device as an alternative or addition to a traditional password authentication.

As an illustrative example for the above aspect, an authentication management server may function as a cloud-based device manager for an approval app, its accompanying device application. When an approval app on the new device attempts to log-in to an authentication management server using an existing ID, an authentication management server may transmit to the new device various options to register the new device. One or more options may include registering the new device using already registered devices where an authentication management server may transmit a request for an approval to add the new device to the user's registered device. Upon approval from one of the registered devices by a user, the authentication management server may register the new device and a person who has the authority to unlock the new device may access an approval app.

The present disclosure provides a secure and convenient method, system and platform for exchanging sensitive data necessary to authenticate a user and his transaction by using an authentication management server system with its accompanying device application. The present disclosure further provides a secure and convenient method, system and platform for creating, storing, managing, and transmitting a user's sensitive personal data. The present disclosure further provides a secure and convenient method, system and platform for managing a user's devices. Other aspects, advantages, benefits, and salient features of the disclosure will become apparent to those skilled in the art from the following detailed description, which, taken in conjunction with the annexed drawings, discloses various embodiments of the present disclosure.

DETAILED DESCRIPTION

Figure 1:
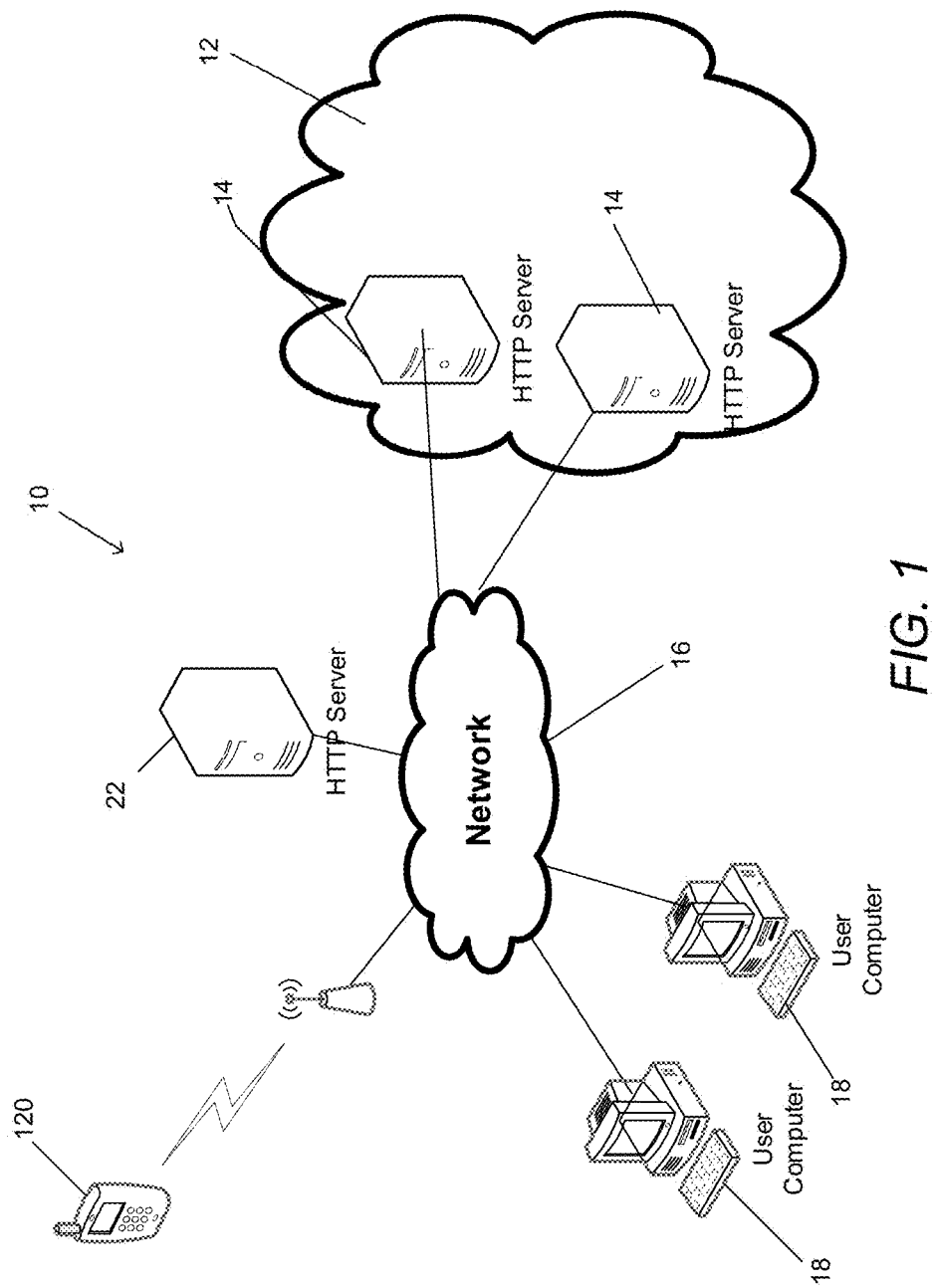
FIG. 1 illustrates devices that perform process in accordance with the disclosed system connected via network connections in accordance with an embodiment of the disclosure.

Various embodiments described herein provide for systems and methods which securely and conveniently authenticate a user to a service provider using an authentication management server and its accompanying cross-platform device application software which can be installed on a user's device.

The following description with reference to the accompanying drawings is provided to assist in a comprehensive understanding of various embodiments of the present disclosure as defined by the claims and their equivalent. The terms and words used in the following description and claims are merely used by the inventor to enable a clear and consistent understanding of the present disclosure without needless repetition of all its meaning, kinds, variation, and applications each time a term or word is used. Various specific details and embodiments in this application are used to describe the principles of the present disclosure and to assist in that understanding. They are provided for illustration purposes only and they are not to be construed as exhaustive or as to limit the present disclosure as defined by the claims and their equivalent. Accordingly, those of ordinary skill should be able to recognize that various changes and modifications of the various embodiments described herein can be made without departing from the scope and spirit of the present disclosure. It is to be understood that the singular forms "a," "an," and "the" include plural referents unless the context clearly dictates otherwise. In addition, descriptions of well-known functions and constructions may be omitted for clarity and conciseness.

In accordance with the various embodiments of the disclosed system, the following are definitions of terms used throughout this disclosure:

Approve: A term used to describe an action a user takes to authorize a user's computing or mobile device to transmit specific commands to an authentication management server.

Approval App: A term used to describe unique cross-platform device application software which can be installed on a user's device to communicate with a service provider through an associated authentication management server of the service provider.

Approval ID: A term used to distinguish a user's ID for the approval app and an associated authentication management server from other IDs a user used for other service providers.

Authentication Management Server: A term used to describe a server system that communicates on a secured network with a service provider and a user through a device application described as an approval app that is installed on a user's device.

Biometric Authentication: A term used to describe a security process performed by a computing or mobile device that relies on the unique biological characteristics of a user including, fingerprint, facial recognition, voice recognition and/or retina/iris scan to verify the user so the user can unlock his device or, once a device is unlocked, to authorize a device or an application installed on his device to perform specific action if a request is approved.

Device: A term used to describe any computing device, such as a desktop, a laptop computer, a terminal, kiosk and any mobile device such as mobile phone, smart phone or tablet device with a network connectivity including, via internet, intranet, cellular network and/or VPN.

Password: A term used to describe a string of characters such as PIN or authorization code to authenticate a user to a service provider so the user may log-in to the service provider's system, database or network, or authorize the service provider to perform a certain action. A certain action can include, but is not limited to, a financial transaction.

Push notification: A term used to describe any message which appears on a user's device display as a result of a service provider pushing or transmitting content, sometimes using an installed application or an open window of a website, in the form of a banner, alert, pop-up bubble, or dialog box.

Request (for Approval): A term which describes a message a service provider transmits to a user's device display, through an authentication management server, seeking a specific action from a user.

Service Provider: A term used to describe any private or public entity which maintains, as a part of a provided service, an accessible system, database, or network for a user to use and/or transact within either through an internet based service such as a website, VPN, remote network, a separate software application installed on a user's device, intranet based connection or a specialized remote terminal such as ATM or airline kiosk. The term also includes any private or public entity which a user may physically its place of business such as a bank teller, library, DMV (Department of Motor Vehicle) or dial-in to an automated system or to a live customer service staff such as phone banking and upon authentication of a user's identity, a user can access, use and/or transact within the service provider's database, network, or system.

User: A term used to describe any individual who wants to access a service provider's database, network or system such as an employee, a customer, or a member.

One or more embodiments described herein provide that methods, techniques, and actions performed by a device are performed programmatically, or as a computer-implemented method. Programmatically, as used herein, means using code or computer-executable instructions. These instructions can be stored in one or more memory resources of the computing device. A programmatically performed step may or may not be automatic.

One of more embodiments described herein can be implemented using programmable modules, engines, or components. A programmable module, engine, or component can include a program, a sub-routine, a portion of a program, or a software component or a hardware component capable of performing one or more stated tasks or functions. As used herein, module or component can exist on a hardware component independently of other modules or components. Alternatively, a module or component can be a shared element or process of other modules, programs or machine.

Some embodiments described herein can generally require the use of computing devices, including processing and memory resources. For example, one or more embodiments described herein may be implemented, in whole or in part, on computing devices such as servers, desktop computers, laptop computers, mobile phones, smart phones, tablet devices and network devices. Memory processing and network resources may all be used in connection with the establishment, use, or performance of any embodiment described herein including with the performance of any method or with the implementation of any system.

Furthermore, one or more embodiments described herein may be implemented using instructions that are executable by one or more processors. These instructions may be carried on a computer-readable medium on which instructions for implementing embodiments described herein can be carried and/or executed. In particular, the numerous machines shown with examples described herein include processor(s) and various forms of memory for holding data and instructions. Examples of computer-readable mediums include permanent memory storage devices, such as hard drives and SSD (Solid State Drive) on personal computers or servers. Other examples of computer storage mediums also include portable storage units, such as CD or DVD, flash memory, SSD, and magnetic memory. Computers, terminals, and network enabled devices are all examples of machines and devices that utilize processor, memory, and instructions stored on computer-readable mediums. Additionally, embodiments may be implemented in the form of computer-programs, or computer usable carrier medium capable of carrying such a program.

Processing Environment

A network that includes user devices and systems that authenticate a user for a service provider in accordance with some embodiments of this invention is shown in FIG. 1. Network 10 includes communications network 16. Communications network 16 is a network such as the Internet that allows devices connected to network 16 to communicate with other connected devices. Each of one or more service provider server systems 14 of service provider network is connected to network 16. In accordance with some embodiments, two or more service provider server systems 14 communicate with one another over the network to form a cloud server system 12 to allow the servers 14 of cloud system 14 to perform processes of a provided system in a distributed manner. Those skilled in the art will recognize that while two servers are shown, any number of servers may be included in cloud server system 12. Furthermore, one or more database servers (not shown) maybe communicatively connected to any one of servers 14 to store data and provide various processes.

Authentication management system server 22 also connects to communications network 16 to communicate with various user devices and the service provider servers 14 14 to authenticate a user to a service provider as described in detail below, Similar to the service provider system. The authentication management system server may be a part of one or more servers in a cloud server system that provides authentication services as described below.

Users interact with the service provider system and authentication management using a user device connected to communications network 16. Some examples of appropriate devices include, but are not limited to, devices 18 and 20 that connect to network 16. In the shown embodiment, personal device 18 is shown as a desktop computer that is connected via a conventional "wired" connection to network 16. However, personal device 18 may be a desktop computer, a laptop computer, a smart television, an entertainment gaming console, automobile infotainment system, and/or any other device that connects to network 16 via a "wired" connection. Mobile device 20 connects to network 16 using a wireless connection. A wireless connection is a connection that uses Radio Frequency (RF) signals, Infrared signals, or any other form of wireless signalling to connect to network 16. In FIG. 1, mobile device 20 is a mobile telephone. However, mobile device 20 may be a mobile phone, Personal Digital Assistant (PDA), a tablet, a smartphone, or any other type of device that connects to network 16 via a wireless connection without departing from this invention.

Processing System

Figure 2:
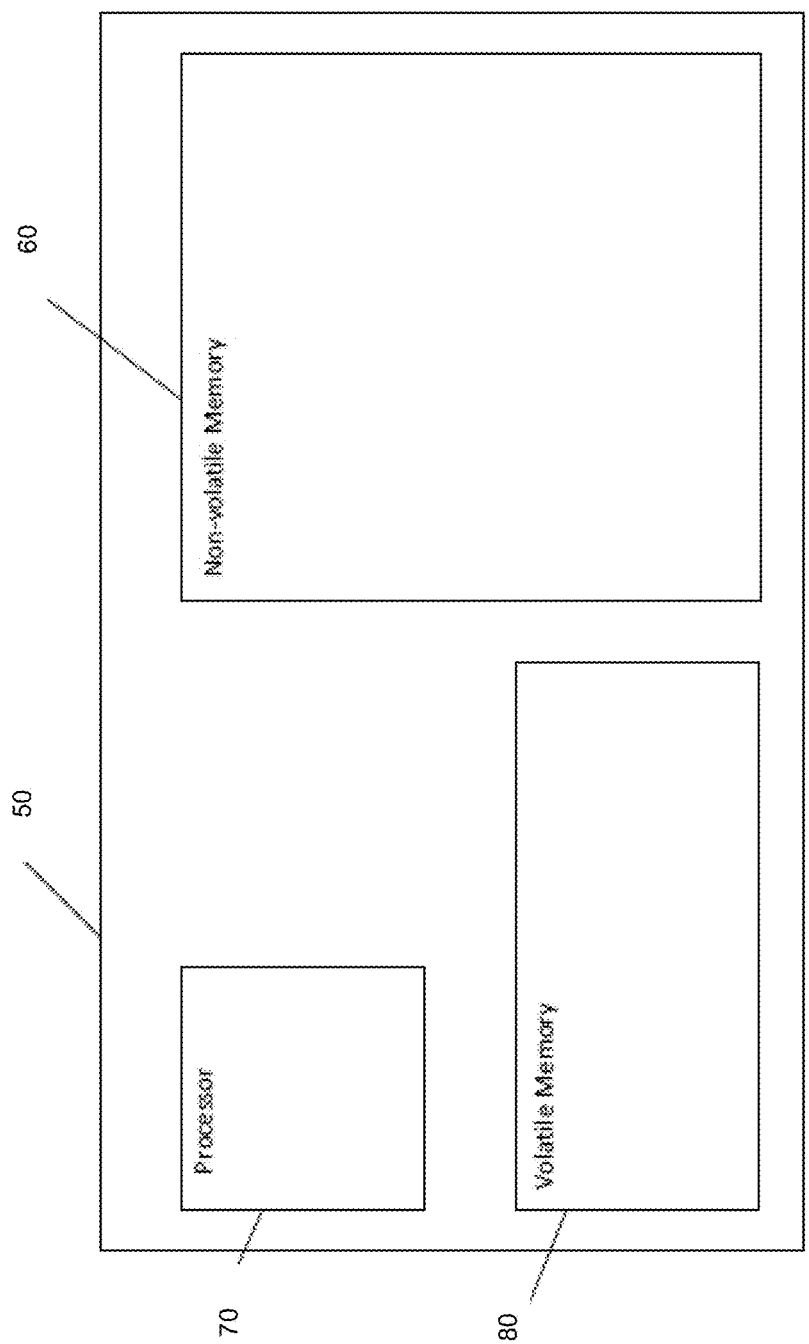
FIG. 2 illustrates a processing system in a computing device performing processes to provide the disclosed system in accordance with various embodiments of the disclosure.
Figure 3:
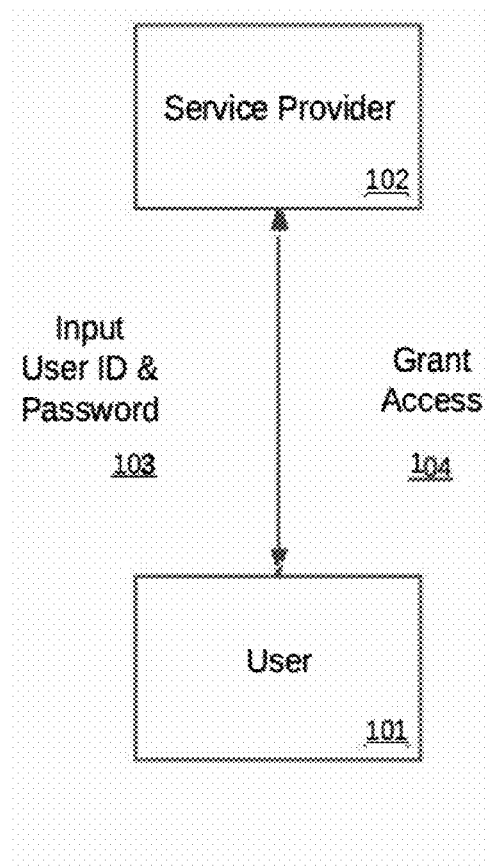
FIG. 3 illustrates a typical environment in which a user and a service provider interact with each other in accordance with an embodiment of the disclosure.

An example of a processing system that executes instructions to perform processes that provide applications, such as the processes that authenticate a user for a service provider system using the devices shown in FIG. 1 in accordance with some embodiments of this invention is shown in FIG. 2. One skilled in the art will recognize that a particular processing system may include other components that are omitted for brevity without departing from this invention. The processing device 50 includes a processor 70, a non-volatile memory 80, and a volatile memory 60. The processor 70 is a processor, microprocessor, controller, or a combination of processors, microprocessor, and/or controllers that performs instructions stored in the volatile 80 or non-volatile memory 60 to manipulate data stored in the memory. The non-volatile memory 60 can store the processor instructions utilized to configure the processing system 50 to perform processes including processes in accordance with embodiments of the invention and/or data for the processes being utilized. In other embodiments, the processing system software and/or firmware can be stored in any of a variety of non-transient computer readable media appropriate to a specific application. A network interface is a device that allows processing system 50 to transmit and receive data over a network based upon the instructions performed by processor 70. Although a processing system 50 is illustrated in FIG. 2, any of a variety of processing system in the various devices can be configured to provide the methods and systems in accordance with embodiments of the invention.

Authentication Management Server Description

In accordance with some embodiments, the following steps illustrate how a user may set up a new account and ID with an authentication management server. A user may start by downloading an approval app, the authentication management server's accompanying device app, from various resources. Such resources can include, for example, a website, Microsoft Store, App Store and Google Play. A user then installs and runs an approval app on the user's device which may guide the user through an account set-up process. A new account set-up process can include, for example, possible two options such as "Set-up new ID" 1101 or "Already have an account" 1102 for a user to choose from (FIG. 13).

Figure 9:
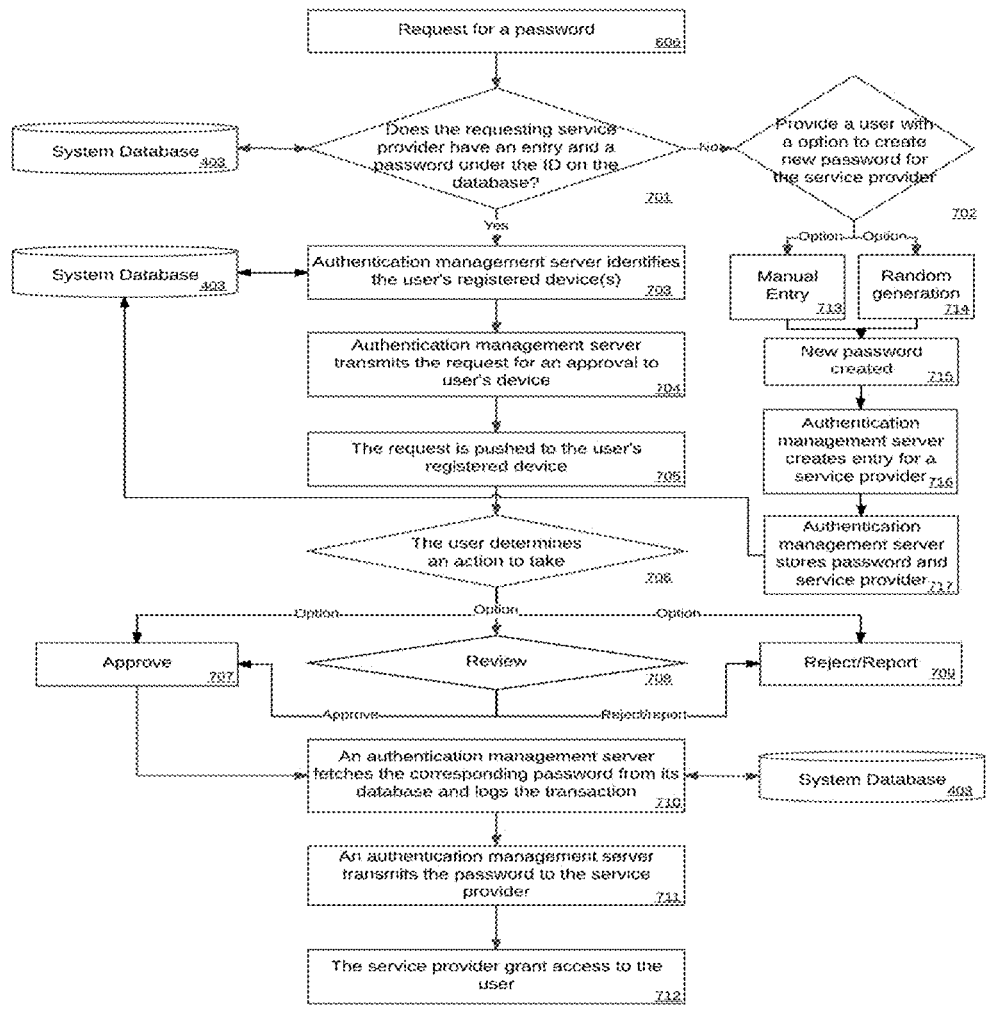
FIG. 9 is a flow diagram showing a routine for transmitting a user's unique password to a service provider in accordance with an embodiment of the disclosed system.
Figure 12:
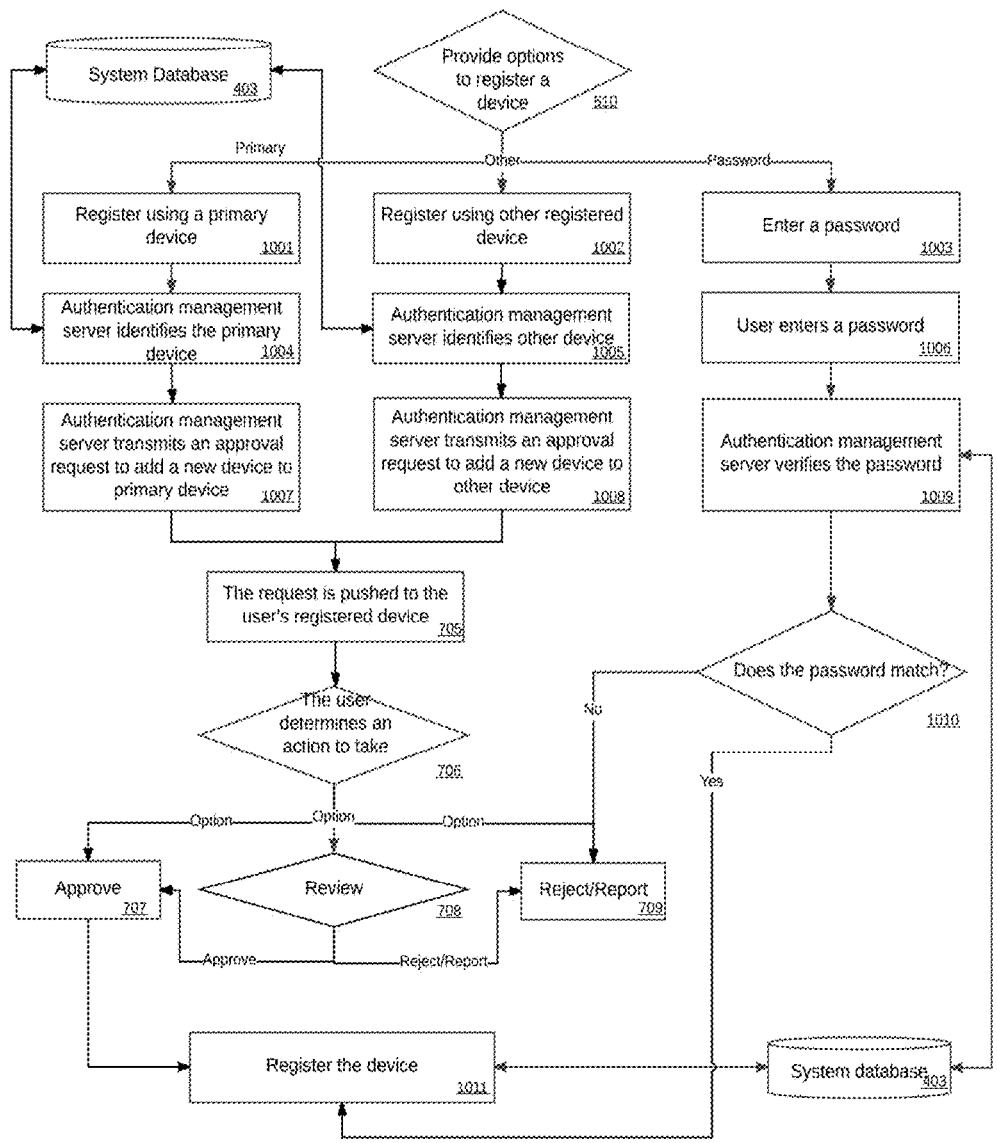
FIG. 12 is a flow diagram showing a routine for enrolling and registering additional device to an authentication management server in accordance with an embodiment of the disclosed system.
Figure 13:
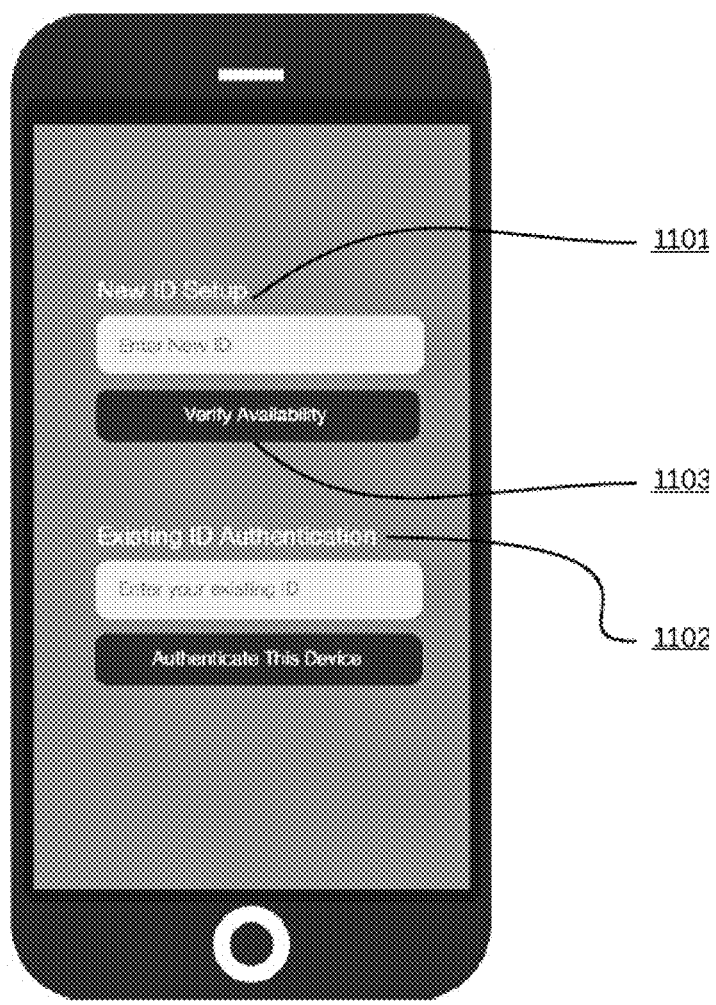
FIG. 13 is a screenshot of a device application user interface for setting up a new ID in accordance with an embodiment of the disclosed system.
Figure 14:
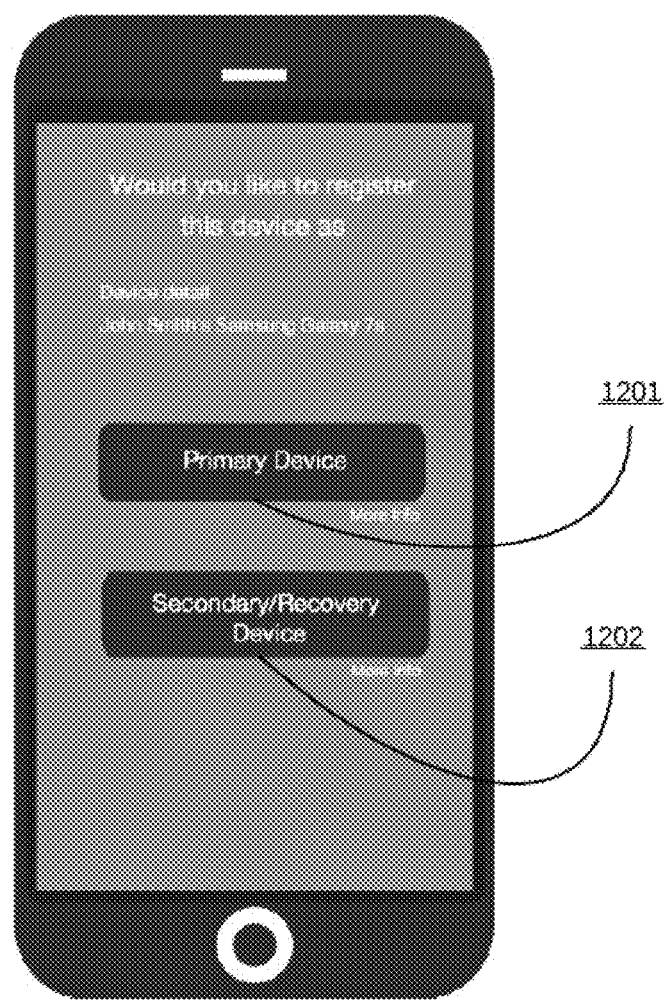
FIG. 14 is a screenshot of a device application user interface for registering a new device in accordance with an embodiment of the disclosed system.

The user may click on "set-up new ID" option 1101 and click on "Verify Availability" 1103 (FIG. 13). Once an approval app confirms that the user's newly entered approval ID is unique and usable, the user may proceed to register his device as "trusted device" with an authentication management server (FIG. 14). An authentication management server then may create a new entry for the new approval ID and links the user's device (FIG. 12). An authentication management server can also create, store, manage, and/or transmit a password to a service provider upon the user's approval (FIG. 9). In another exemplary implementation, an authentication management server can further maintain, manage, and/or transmit a user's profile and other information to a service provider upon the user's approval (FIG. 9).

In accordance with some other embodiments, the user can further register a user device either as a primary device 1201 or an additional device 1202 (FIG. 14). If the user registers a user device as one of primary devices, the authentication management server may vest the device with an authority to approve various requests from a service provider along with other administrative privileges for the authentication management system such as access to settings, device management, viewing of transaction logs and so on.

Figure 16:
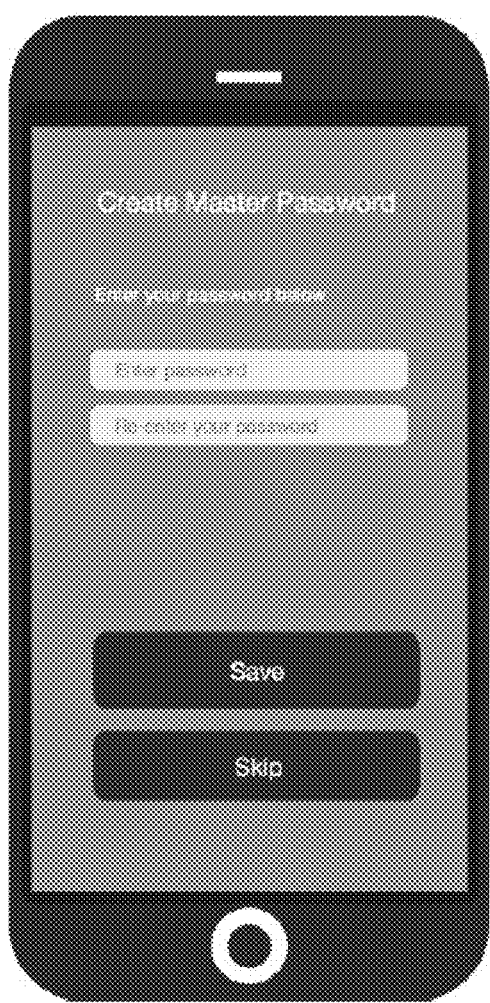
FIG. 16 is a screenshot of a device application user interface for creating a master password in accordance with an embodiment of the disclosed system.

In accordance with a number of embodiments, a user may be prompted to create a password for the approval app and an associated authentication management server so that a user may set up additional user devices more conveniently and to access various administrative settings and for user device management (FIG. 16).

In accordance with an embodiment of the disclosed system, the following steps illustrate a device to device authentication method where a user can further register additional user devices by installing an approval app under the same user ID on other user devices for convenience or as a recovery device or as an authentication device for added security without a password (FIG. 12). A traditional method of authenticating and registering additional user devices for many cloud-based servers and an associated mobile device application involves a user ID and a password. A device to device authentication method uses at least one already registered user device to authorize and register a new user device.

In accordance with some embodiments, the following steps illustrate how a user may register additional user devices or additional users using the approval app on an existing user device. The user can follow the steps illustrated in FIG. 7 to download, install, and run the approval app on a new device (e.g., an IPad or a tablet PC), which the user intends to register. On the approval app's user interface on the new device, the user can click on "Already have an account" option 1102 and enter his existing approval ID. The approval app, after communicating with the authentication management server, can confirm the existing ID and further display that the current user device is not registered as the "trusted device" and provide the user with possible three options to proceed: (FIG. 10) Option 1: Register this user device using one of the primary devices 1001. Option 2: Register this user device using other registered user devices 1002. Option 3: Register this device using the password 1003.

Figure 17:
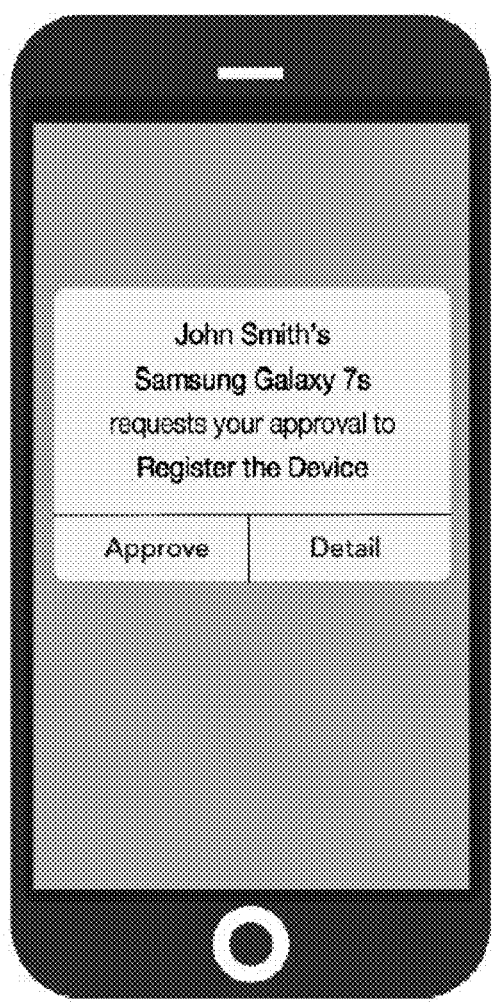
FIG. 17 is a screenshot of a device application user interface for granting approval to register a new device in accordance with an embodiment of the disclosed system.

When the user clicks on Option 1 1001, the authentication management server communicates with the user device by transmitting a request (to add an additional user device) for approval via push notification function of approval app on an already-registered primary user device 1007 (FIG. 12) as illustrated in FIG. 17. The request from the service provider can only be transmitted to registered primary user devices that the user previously registered. Therefore, the new user device, which is not yet registered, will not receive the request but the user's other registered primary user devices (e.g., a mobile phone) will receive the request. The user can review and approve the request from the authentication management server on any registered primary user device (e.g., a mobile phone in his pocket) if the request is legitimate and the user wishes to proceed 707. When the user approves the request on a primary user device, the authentication management server registers the new user device under the user's approval ID 1011. The user can repeat these steps to register other user devices.

Figure 7:
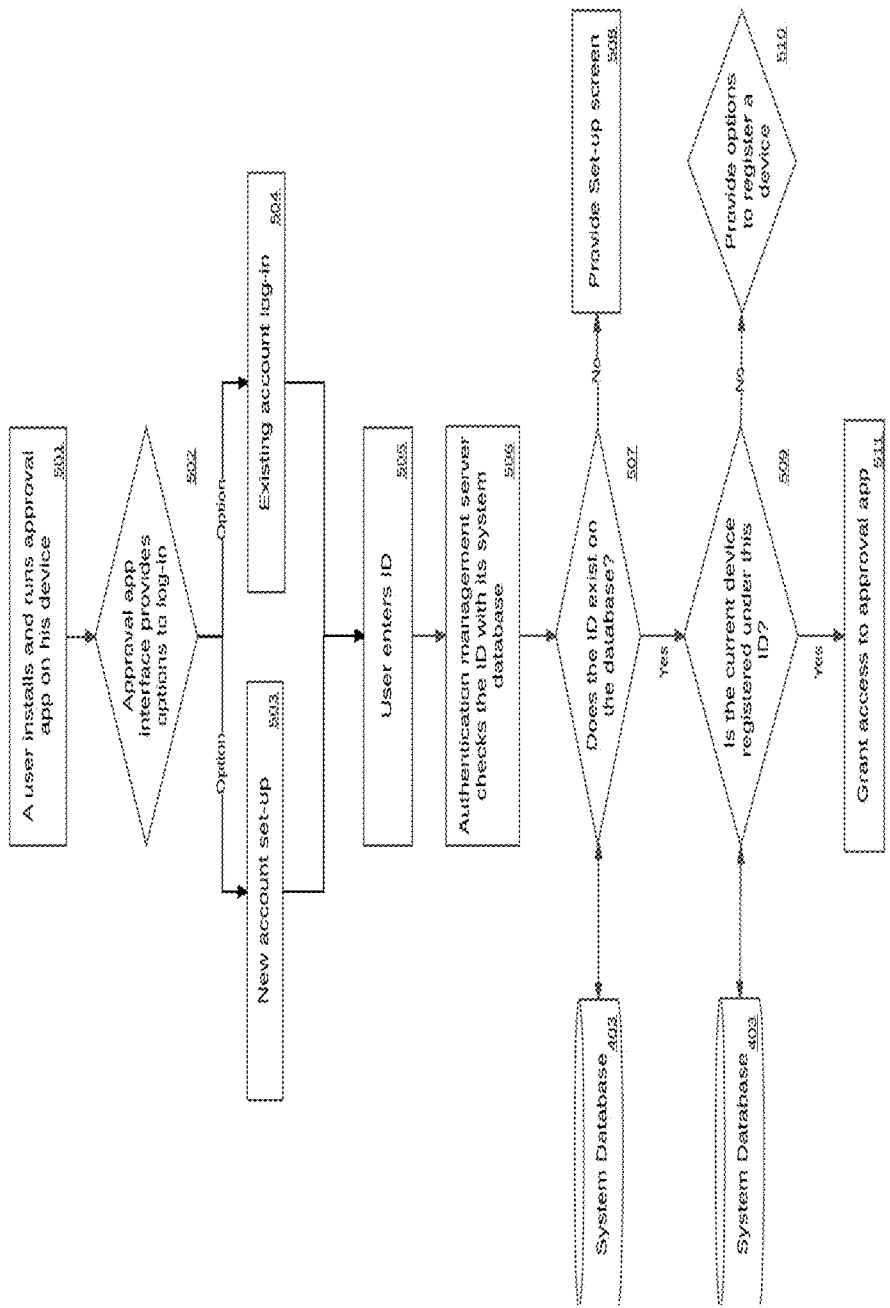
FIG. 7 is a flow diagram showing a routine for installing a device app on a user's device in accordance with an embodiment of the disclosed system.

In accordance with many embodiments, the user can use the above procedure to add a new user (e.g., a caretaker, parent or otherwise an individual the user trusts or a company IT administrator) under the same approval ID of the user (FIG. 7 and FIG. 12). Accordingly, the new user must have the device unlocking authority for the newly added user device. The user may grant full or limited privileges within the approval app to the new user device and/or new user.

Figure 18:
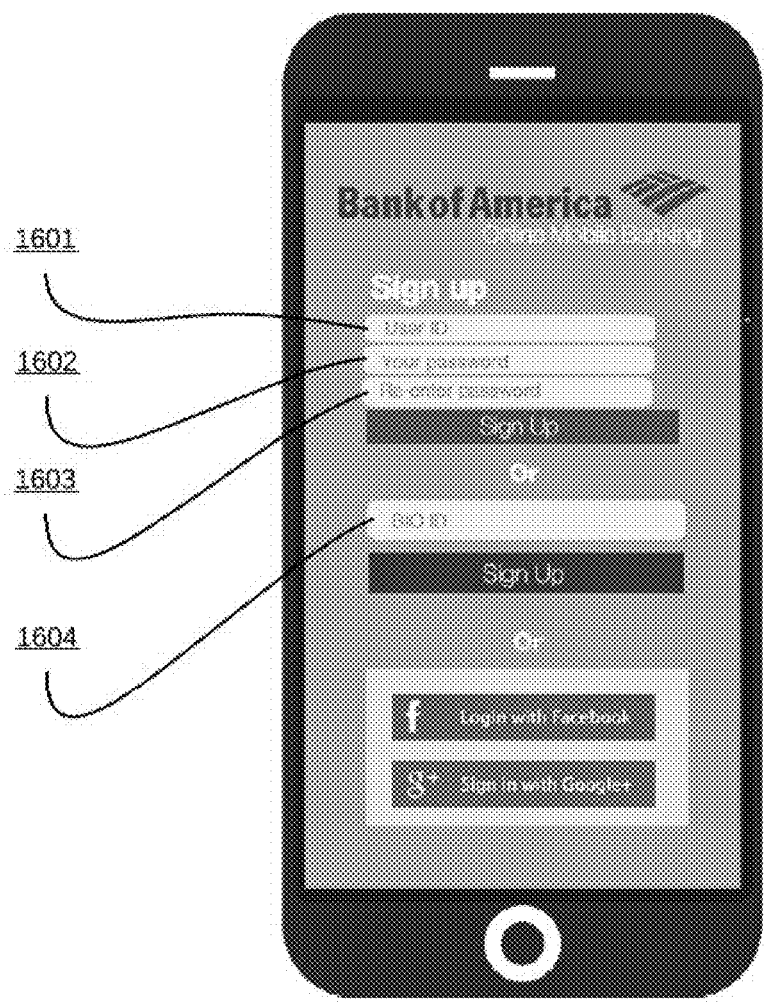
FIG. 18 is a screenshot of a user interface of a service provider's mobile website or mobile application equipped with an option to sign-up using an authentication management server ID in accordance with an embodiment of the disclosed system

In accordance with some embodiments, the following steps illustrate how a user with an existing approval ID may set up a new account with a service provider (FIG. 9). A service provider can feature an account set-up screen enabled with an approval ID field and an authentication icon button or link, 1604 which can be programmed to send a specific request command to the authentication management server instead of, or in addition to, providing traditional data fields such as the ID, 1601, password 1602, and/or to reconfirm password 1603 (FIG. 18).

Figure 19:
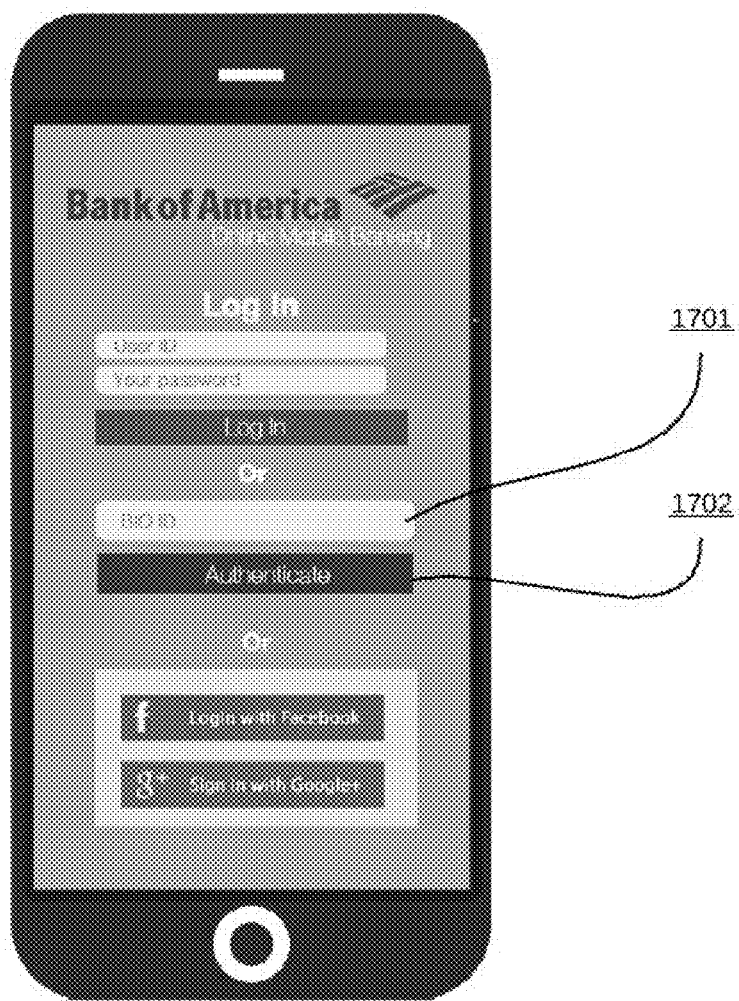
FIG. 19 is a screenshot of a user interface of a service provider's mobile website or mobile application equipped with an option to log-in using an authentication management server ID in accordance with an embodiment of the disclosed system.
Figure 21:
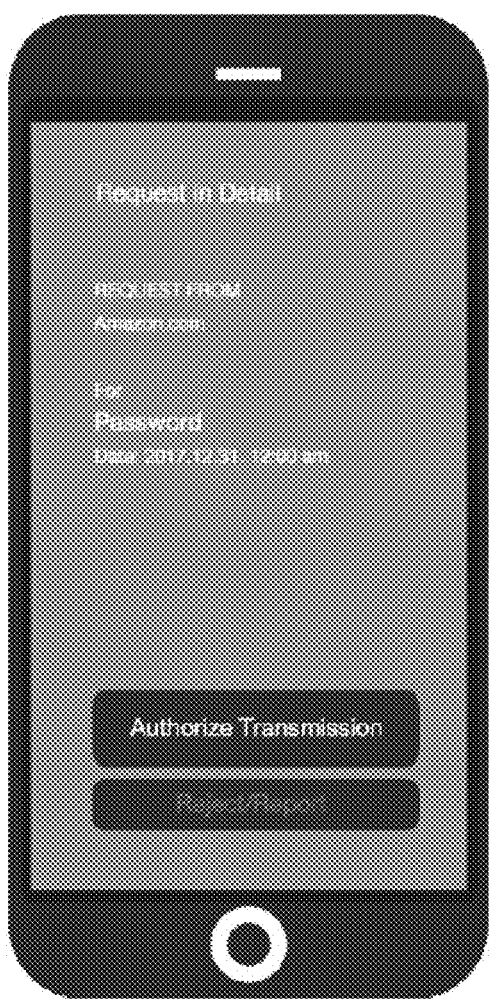
FIG. 21 is a screenshot of a device application user interface for viewing the request in detail in accordance with an embodiment of the disclosed system.

A user may enter an approval ID already created 1101 in the authentication management server through an accompanying approval app on an associated user device (FIG. 13). The service provider then transmits a request for a new password to the authentication management server 606 to finish the set-up process after approval ID is confirmed. The confirmation may include an indication that the provided approval ID does not conflict with any accounts already registered and stored. The authentication management server can communicate with the user via a push notification function of the approval app on the registered user device by transmitting a request for approval (FIG. 19). A request may include a summary, brief or detailed actions which an authentication management server is to perform if approved by a user through an approval app (FIG. 21).

Figure 22:
FIG. 22 is a screenshot of a device application user interface for granting approval in accordance with an embodiment of the disclosed system.

An approval on a user device can be achieved by simply unlocking the user device when the request from the service provider system is pushed to a user device using either any biometric authentication process such as retina or iris scan on Microsoft device, facial recognition or Touch ID on Apple device, a similar fingerprint scan on Android device; or a password or pattern input process; and/or any other means a user has set up a security function on a user device (FIG. 22).

In accordance with some other embodiments, an approval can also be achieved by first unlocking the device and tapping on the request, message, banner, alert, pop-up bubble or dialog box received via push notification to review its request 1802 and then approve, in whole or in part (FIG. 21), the request using the same or similar method as required to unlock the device for added security as illustrated in FIG. 22.

Figure 25:
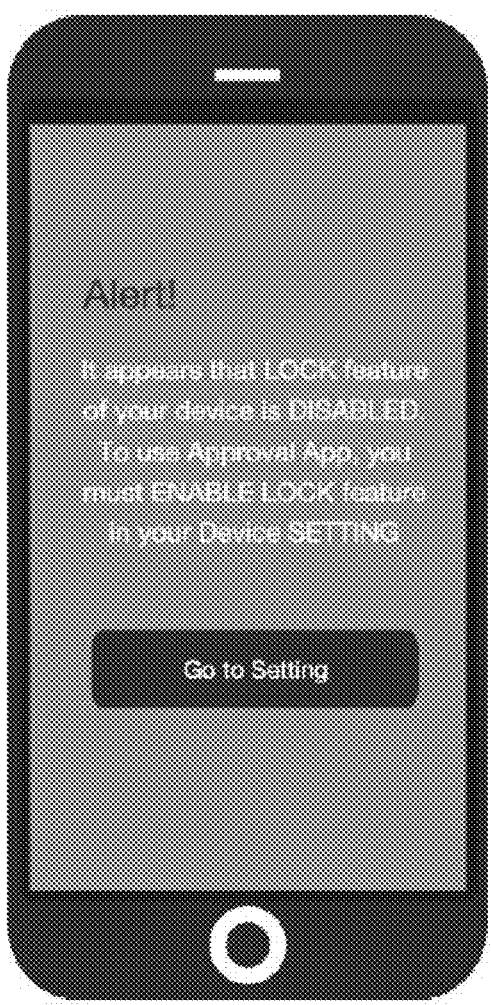
FIG. 25 is a screenshot of a device application user interface for alerting a user to enable "lock" feature of the device that the user intends to use in accordance with an embodiment of the disclosed system

In accordance with many embodiments, a user who did not set up any authentication process for unlocking a user device may still be required, by an approval app, to set up the user device's own biometric authentication process, password input, pattern input, or any other means usually associated with unlocking the user device before using an approval app for added security (FIG. 25). Biometric data of a user that the user device stores internally does not get transmitted to an authentication management server or any other service provider. As such, the biometric data does not get stored on an authentication management server or any other service provider system.

The user can review the request from a service provider system on a user device and approve the request if the request is legitimate and the user wishes to proceed. When the user approves the request on a user device, an authentication management server identifies, creates and indexes the name of the new service provider under the user's ID 716, generates password unique to the service provider either by automated random generation 714 or user's manual entry 713, then transmits newly created, preferably encrypted, password back to the requesting service provider system for service provider record keeping 711. Upon receiving the new password associated with the approval ID, the service provider system may create an account and direct the user to rest of the set-up or enrollment process so the user may input additional data manually. A user may repeat the above steps whenever the user wants to open new accounts with one or more additional service provider systems. Furthermore, an authentication management server may allow a user to have almost unlimited number of service provider accounts with all unique different passwords for each account without a user having to create passwords; store the passwords in any other place; remember the passwords; find the passwords; transfer the passwords; or even enter the passwords. An authentication management server may further reduce the risk of losing passwords; misplacing the passwords; or having other people spying or phishing on the passwords.

Figure 11:
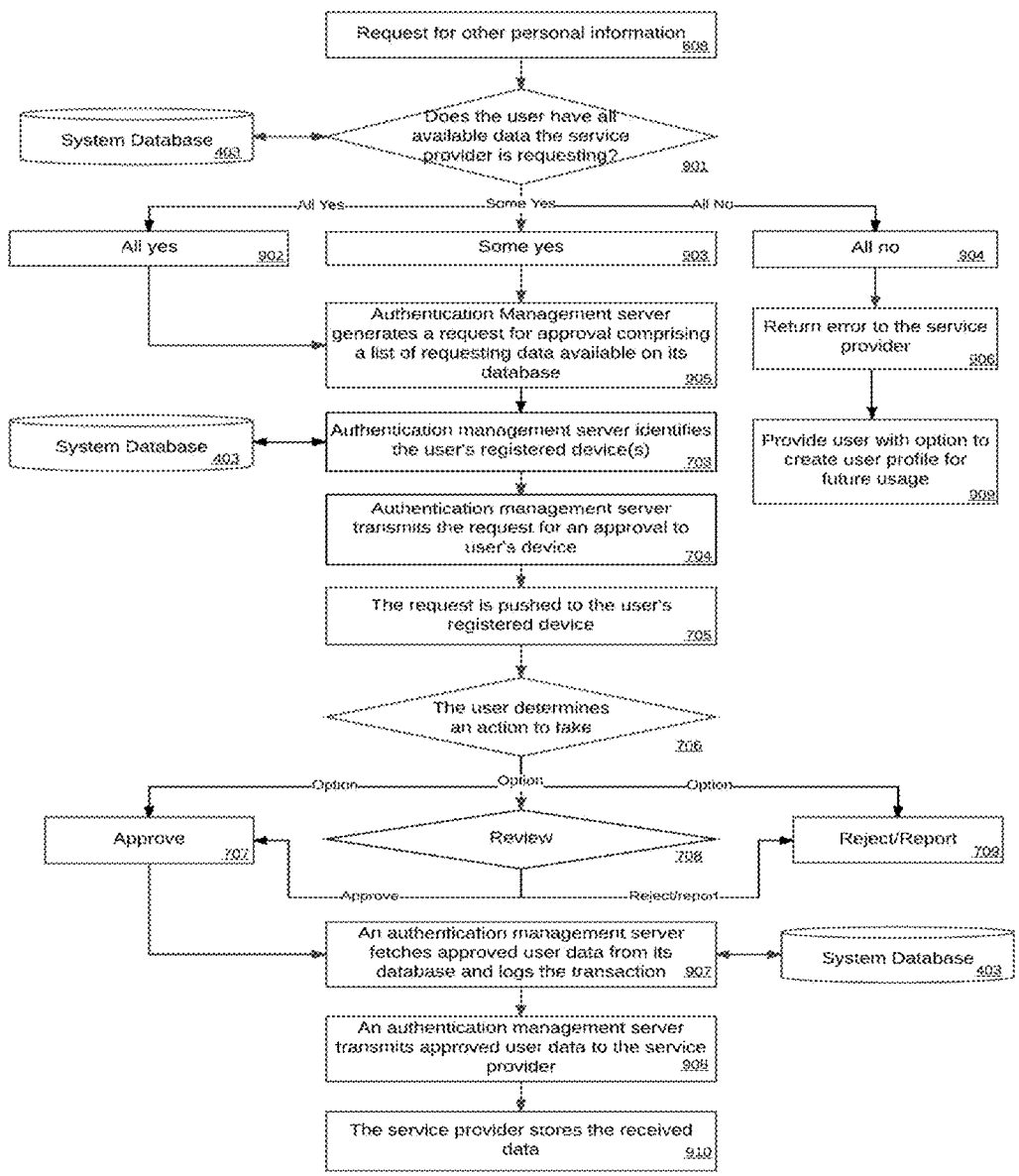
FIG. 11 is a flow diagram showing a routine for transmitting a user's other personal information to a service provider in accordance with an embodiment of the disclosed system.
Figure 23:
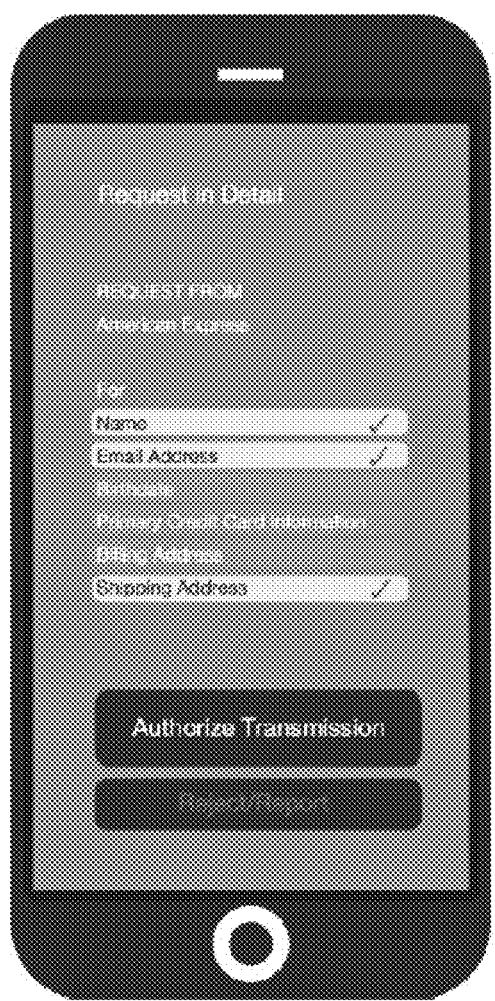
FIG. 23 is a screenshot of a device application user interface for viewing a request for additional information in detail in accordance with an embodiment of the disclosed system.
Figure 24:
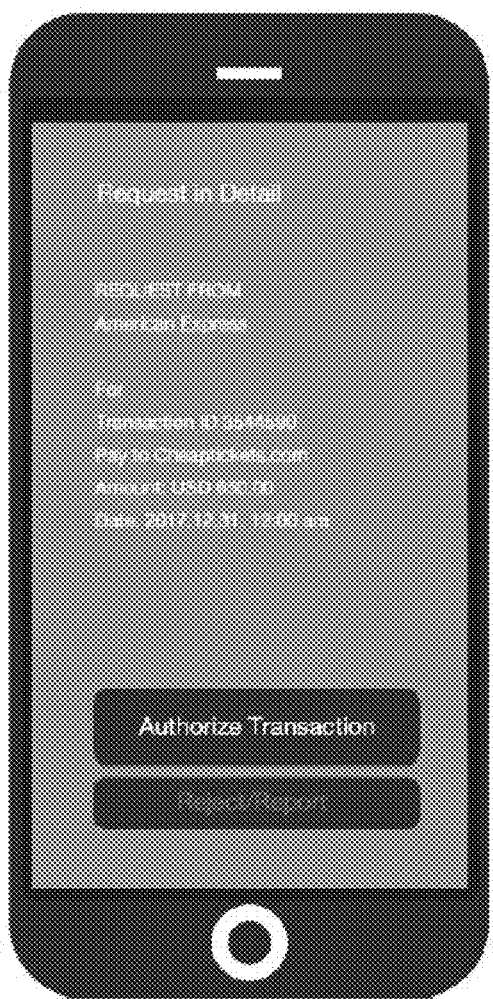
FIG. 24 is a screenshot of a device application user interface for viewing a request in detail in accordance with an embodiment of the disclosed system
Figure 26:
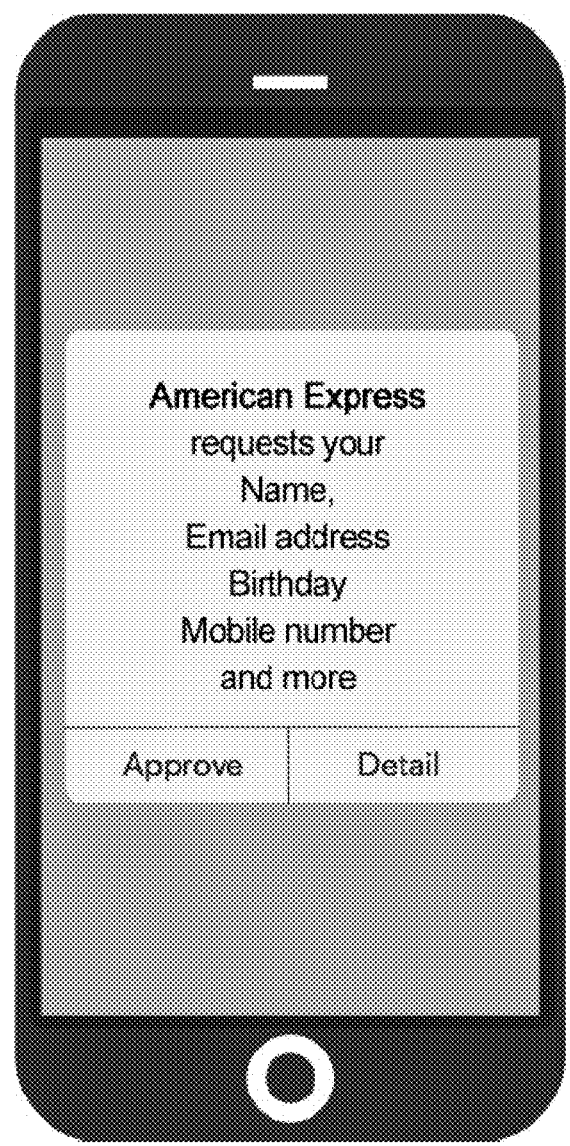
FIG. 26 is a screenshot of a device application user interface for granting approval for additional information in accordance with an embodiment of the disclosed system.

In accordance with a number of embodiments, the service provider system can further transmit additional requests for other information generally associated with an account opening process such as name, credit card information, email address and so on to the authentication management server (FIG. 11). The authentication management server then communicates with the user device via push notification function of the approval app on a registered user device by transmitting a request for approval (FIG. 26). When the user approves the request on the user device, the authentication management server transmits approved corresponding information on file back to the service provider system 908 for automatic data entry and/or for a service provider record 910. A user may approve the request in whole or in part and reject the rest of the request (FIG. 23) on the user device and proceed to either manually enter information on the user interface platform on the user device that is provided by the service provider or decline to enter more information.

In accordance with some embodiments, the following steps illustrate how a user with an existing approval ID can log in to a service provider which a user already has an existing account with using a registered user device 302, 304, or 305. A user simply enters an approval ID or allows the user device to auto-fill the ID data field 1701 and clicks "Authenticate" link or button 1702 without having to enter a matching password. The registered user device can be the same user device that the user is using to access a service provider's system such as q mobile device 304. In another example, the user can use one registered user device 302 (e.g., his laptop or desk top computer) to access the service provider's system while having another registered user device 304 (e.g., mobile phone) in his pocket.

Figure 4:
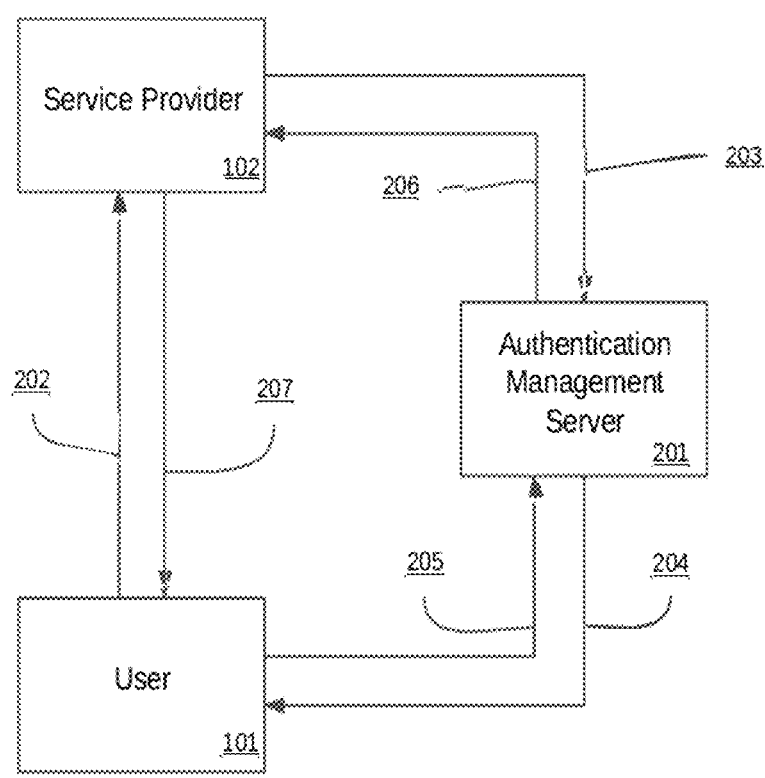
FIG. 4 illustrates an example environment in which an authentication management server is used to manage sensitive data between a service provider and a user in accordance with an embodiment of the disclosure.
Figure 5:
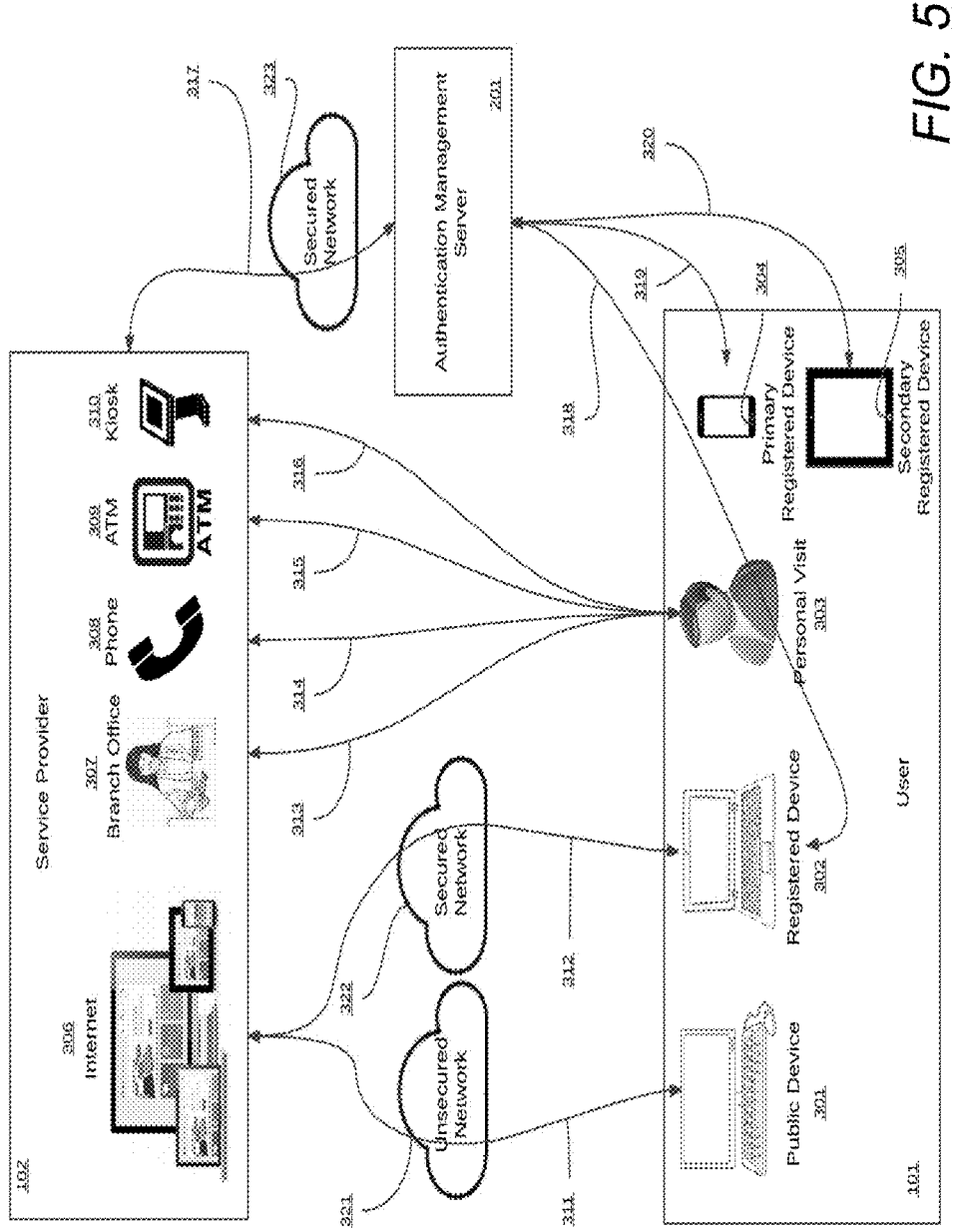
FIG. 5 illustrates an environment in which the disclosed system may be used in various circumstances where a user and a service provider may interact with each other in accordance with an embodiment of the disclosed system.
Figure 6:
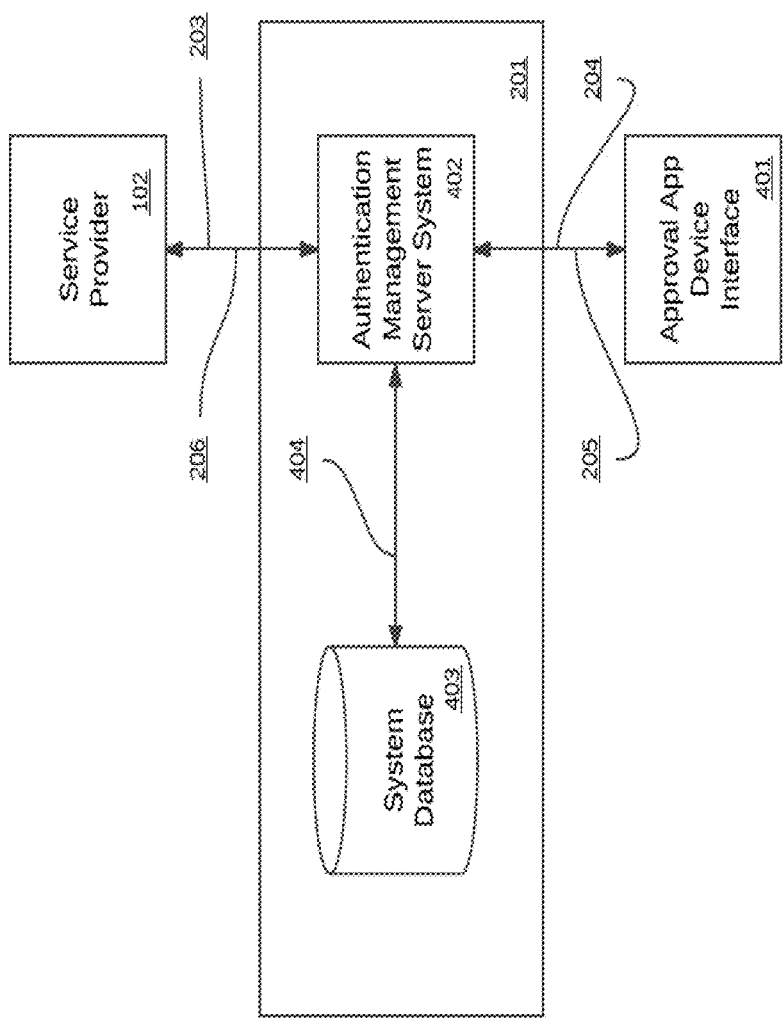
FIG. 6 illustrates an environment in which an authentication management system includes an authentication management server, system database and a device application in accordance with an embodiment of the disclosed system.
Figure 10:
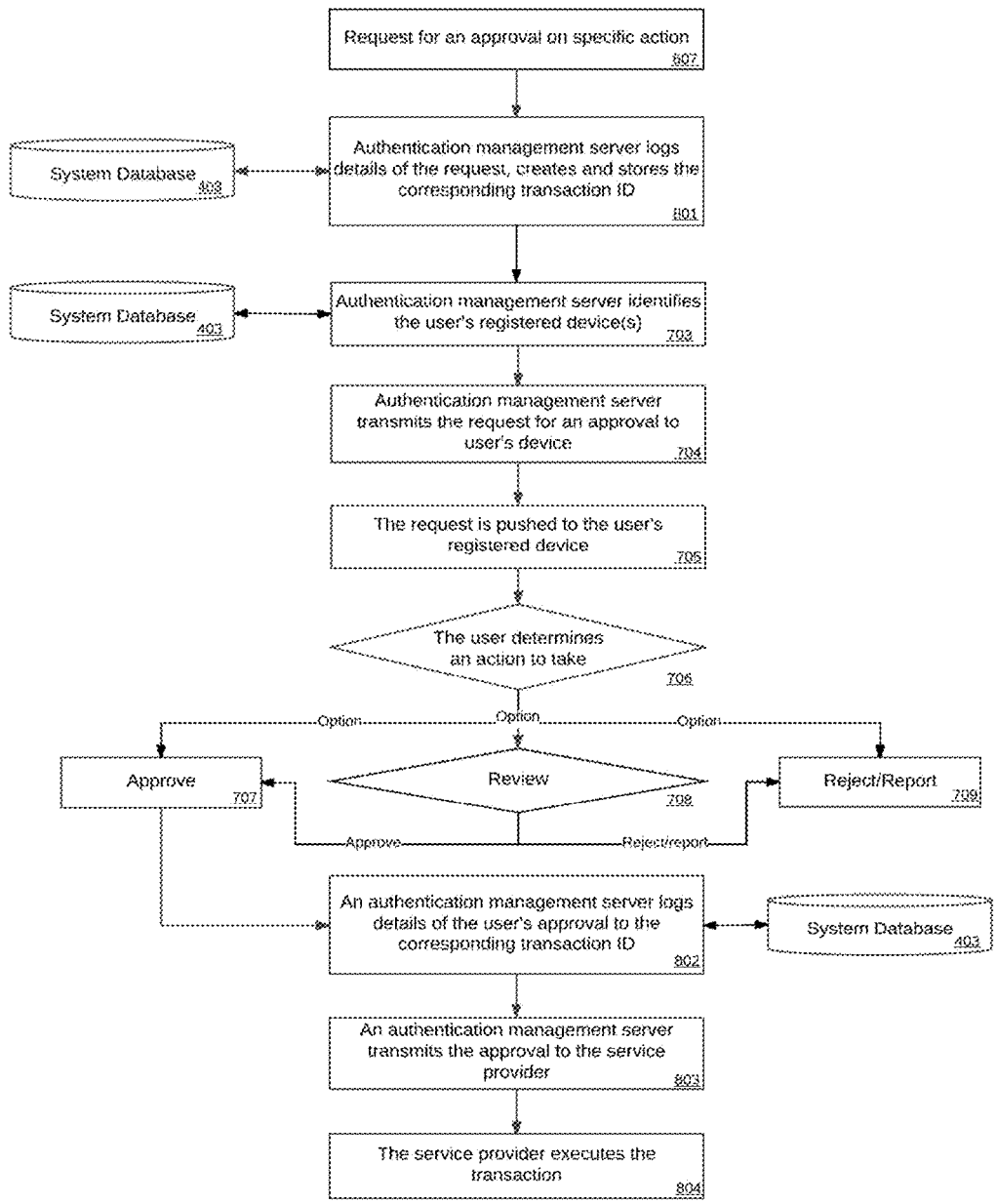
FIG. 10 is a flow diagram showing a routine for transmitting a user's approval to take a specific action to a service provider in accordance with an embodiment of the disclosed system
Figure 20:
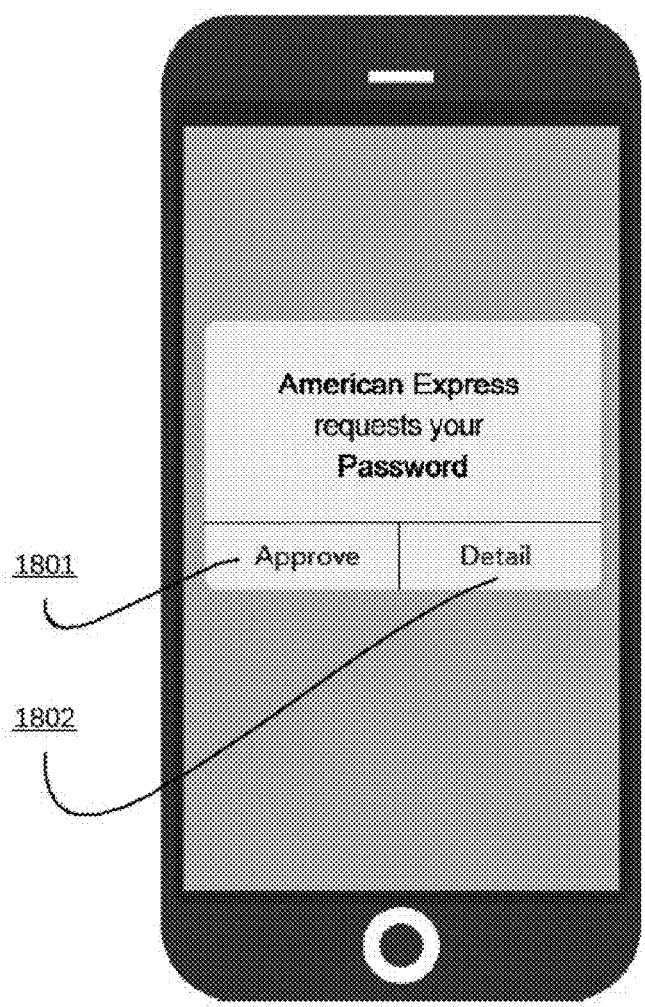
FIG. 20 is a screenshot of a device application user interface for granting approval to transmit a password in accordance with an embodiment of the disclosed system

The service provider system 102 then transmits a request for a password to the authentication management server 201 as illustrated in 203 in FIG. 4. The authentication management server 201 then communicates with the user device 101 via push notification function of an approval app on the registered user device (FIG. 20) by transmitting a request for approval (for a password) 204. The request from the service provider system can be transmitted to all primary user devices that the user previously registered (e.g., a laptop he is currently using and a mobile phone in his pocket) 318, 319, 320 (FIG. 5). The user can review 1802 and approve the request from the service provider system on either of the registered user devices if the request is legitimate and the user wishes to proceed (FIG. 22). When the user approves the request on his device 205, the authentication management server identifies the approval ID and the requesting service provider, fetches a matching password for the specific service provider 710 on service provider database 403, transmits 711, on a service provider secured network 323, a specific, preferably encrypted, password back to the service provider system for authentication. A service provider system may grant a user access 712 to the service provider system on the user device that the user is using after the system's own successful verification. In accordance with many embodiments, only a user with the registered user device receives a request for an approval and a true user of the user device who can unlock the user device to grant approval. Conversely, any person who is not in possession of the registered user device or who does not possess a device unlocking authority even if the device is in his possession will not be able to grant (or refuse) approval. Furthermore, any unauthorized attempt to any service provider system using the user's ID will be displayed on one or more registered user devices so the registered user can review, monitor, reject, and/or report any unauthorized attempts in real time. In accordance with some embodiments, a service provider system can transmit a request for an approval to take a specific action 607 as an alternative or addition to a separate authentication (FIG. 10). If the user is not already logged-in to a service provider, the request for an approval 607 can constitute both as a method for authenticating the user's identity and simultaneously obtaining the registered user's approval to take a specific action as an alternative or addition to traditional OTP (One Time Password) method. When the user is already logged-in to the service provider system, the request for an approval to take a specific action 607 can be required by the service provider as another layer of security before executing sensitive tasks such as financial transactions as an alternative or addition to traditional OTP (One Time Password) method.

Figure 27:
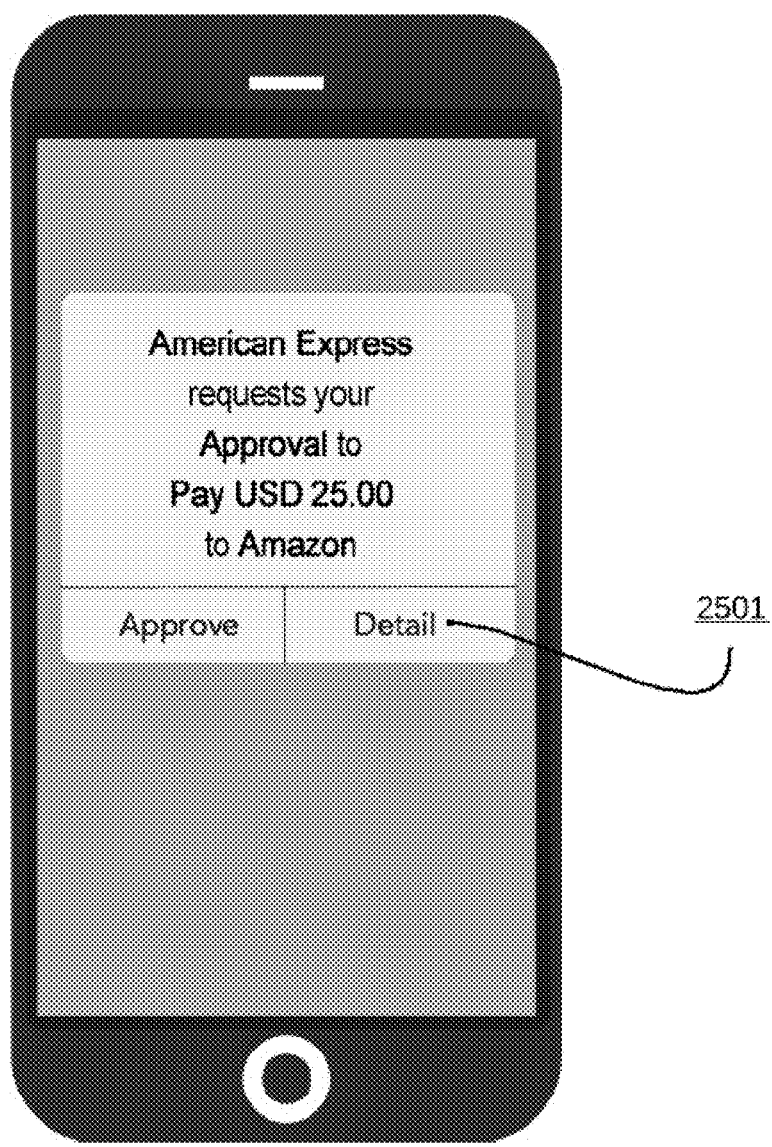
FIG. 27 is a screenshot of a device application user interface for granting an approval for a specific action in accordance with an embodiment of the disclosed system.
Figure 28:
FIG. 28 is a screenshot of a user interface of a service provider's website equipped with an option to log-in using an authentication management server ID in accordance with an embodiment of the disclosed system.

For example, when a service provider (e.g., American Express credit card) determines that a user intends to complete a certain transaction such as authorizing a payment on another party's system (e.g., PayPal or a grocery store credit card terminal) without a separate authentication to the service provider's own system, the service provider system can transmit a request for an approval to a registered user device of the user before executing the transaction via push notification function of an approval app on a registered user device (FIG. 27). The request from the service provider system can be transmitted to all primary registered user devices the user previously registered (e.g., a mobile phone in his pocket). The user can review 2501 and approve 707 the request from the service provider system on any of registered user devices associated with the user if the request is legitimate and the user wishes to proceed (FIG. 10). When the user approves the request on a registered user device, the service provider system can execute the transaction, and the authentication management server can generate and store on the user's database a unique transaction ID detailing the transaction 802. This implementation may complement or eliminate the OTP (One Time Password) method where a user receives an OTP from the service provider on his mobile phone or email, opens the message, transfers strings of characters to the device a user is using and finally executes the transaction.

In accordance with some other embodiments, a user can log-in to a service provider system (e.g., Bank of America's internet banking site 306) and further intend to execute a specific action (e.g., wire transfer to a third party). The service provider system can transmit a request for an approval 607 to a registered user device before executing the transaction via push notification function of an approval app on the registered user device (FIG. 27). The request from the service provider system can be transmitted to all primary registered user devices the user previously registered (e.g., a mobile phone in his pocket). The user can review 2501 and approve 707 the request from the service provider system on any registered user device if the request is legitimate and the user wishes to proceed (FIG. 10). When the user approves the request on a registered user device, the service provider system can execute the transaction, and the authentication management server can generate and store on the user's database a unique transaction ID detailing the transaction 802. This implementation may complement or eliminate the OTP (One Time Password) method where a user receives an OTP from the service provider on his mobile phone or email, opens the message, transfers strings of characters to the device a user is using and finally executes the transaction.

Figure 8:
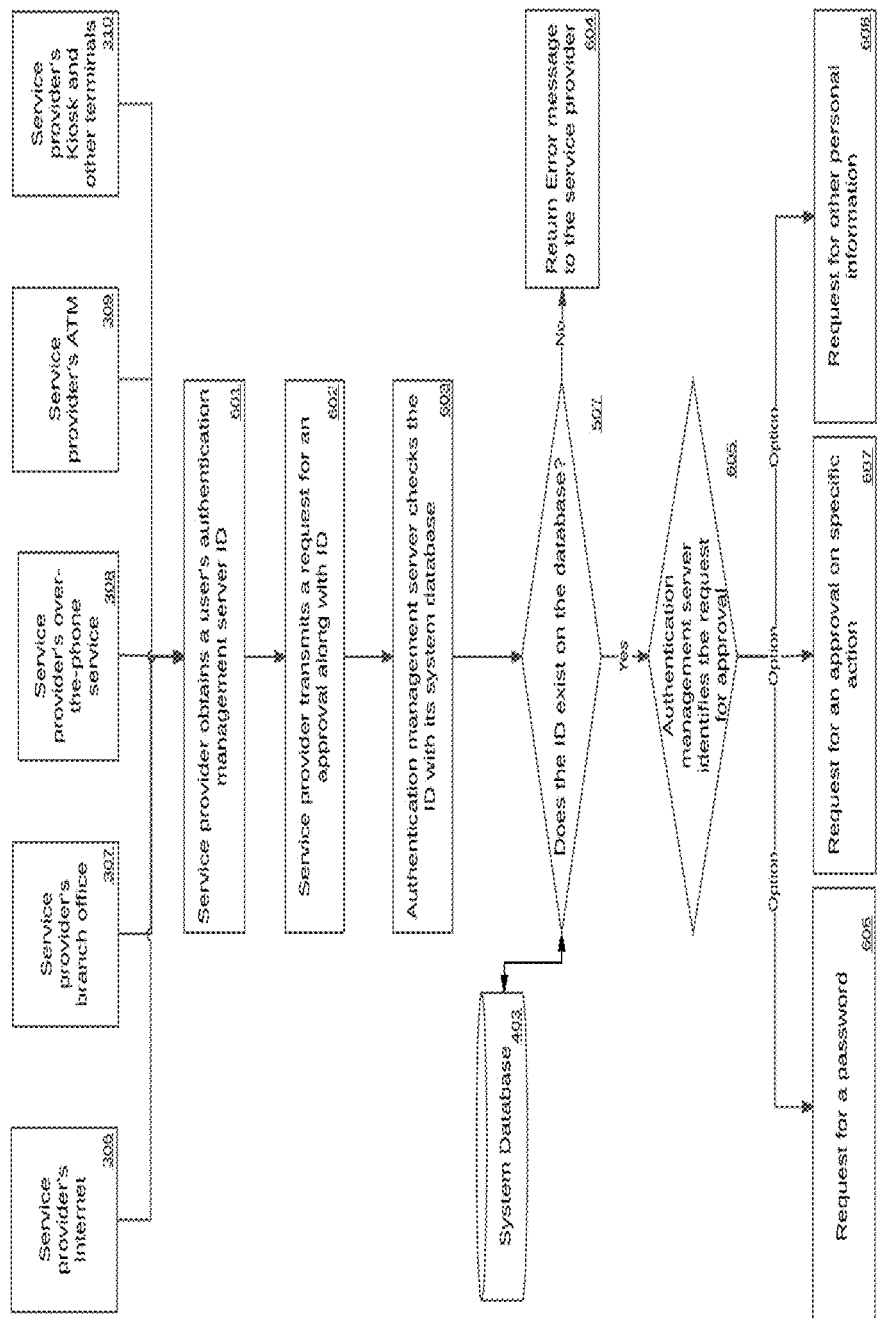
FIG. 8 is a flow diagram showing a routine for a service provider to obtain a user's ID and authenticating a user in connection with various services that an authentication management server performs in accordance with an embodiment of the disclosed system.

In accordance with many embodiments, the following steps illustrate how a user with an existing approval ID can log in to a service provider system which a user already has an existing account with using a non-registered user device or a public device 301 (e.g., a computer at school, library, airport, or hotel) on a public or unsecured network 321. For example, a user can use a school computer's web browser to connect to a service provider's system (e.g., online banking). A user can simply enter his approval ID manually on the approval ID field 2601 of the service provider's sign in window and proceed (FIG. 26). Once a service provider system obtains the user's approval ID 601, the process and the interaction methods between a service provider, an authentication management server through an accompanying approval app and the user at this moment may be identical as to the methods described above with reference to FIG. 8.

The request from the service provider service can be transmitted to all primary registered user devices the user has previously registered. Therefore, as long as the user has at least one registered user device with a cellular network or other internet connectivity (e.g., mobile phone), the user may be able to receive the request on a registered user device and approve (or reject) the request. Since no password is entered or transmitted from a non-registered device 301, the non-registered device 301 (e.g., a school computer), cannot "remember" or store the password on its memory regardless of its current browser setting. Furthermore, no password is entered or transmitted using an unsecured (public) network 321, and the encrypted password is transmitted to a service provider, not from the unregistered device 301 on an unsecured public network 321 but, from the authentication management server 201 on its secure network. 323. Therefore, a risk of security breach is minimized even on a non-registered device on an unsecured public network.

Figure 29:
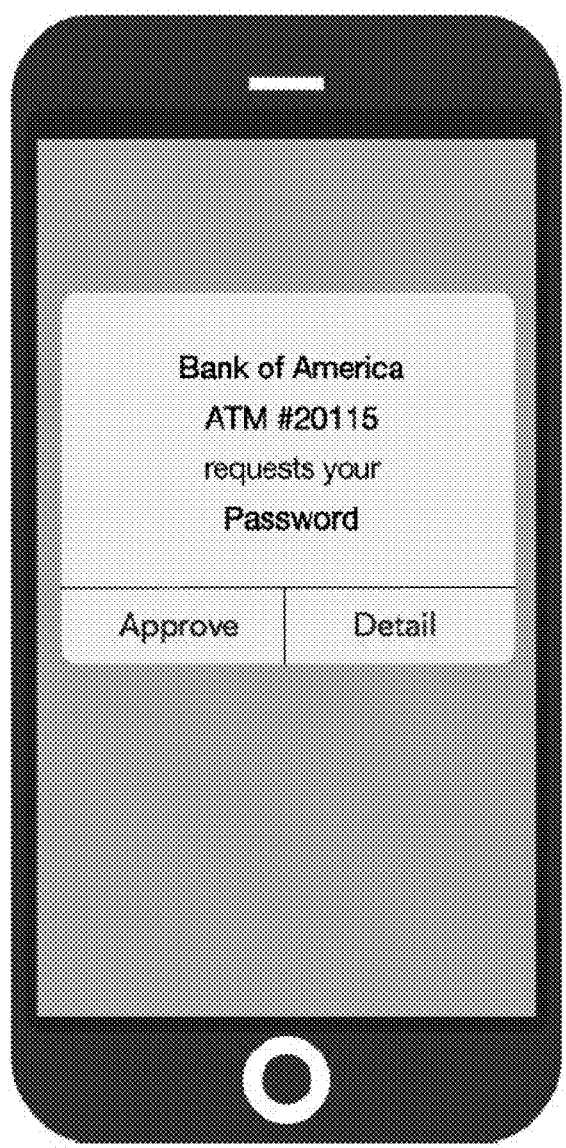
FIG. 29 is a screenshot of a device application user interface for granting approval to transmit a password in accordance with an embodiment of the disclosed system.
Figure 30:
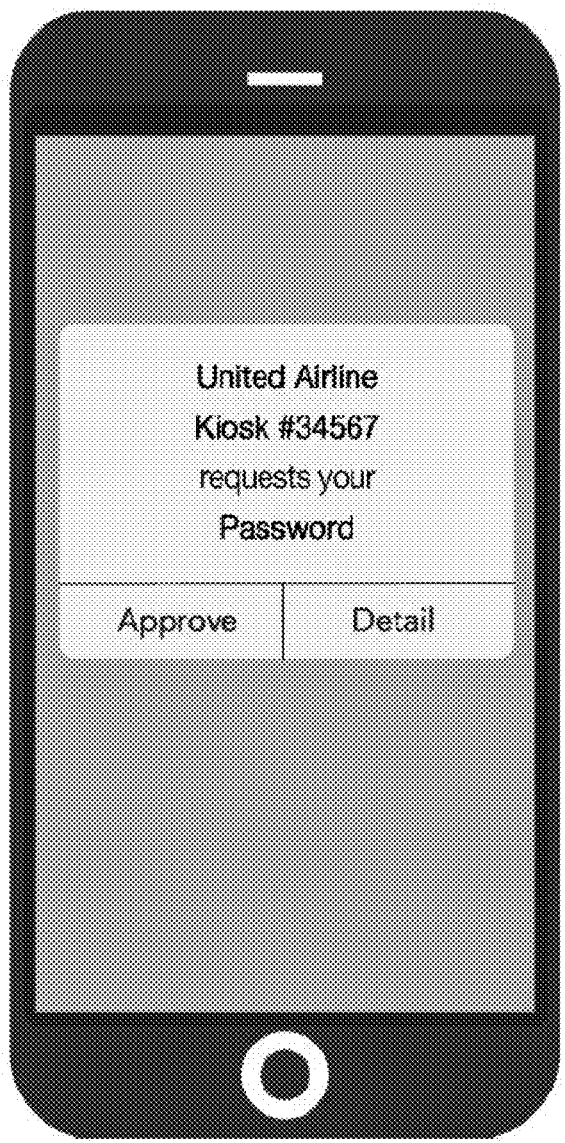
FIG. 30 is a screenshot of a device application user interface for granting approval to transmit a password in accordance with an embodiment of the disclosed system.

In accordance with some embodiments, the following steps illustrate how a user with an existing approval ID can log in to a service provider system which a user already has an existing account using a public device provided by a service provider such as ATM 309, terminal or airline Kiosk 310. A user may simply enter his ID manually on the public device provided by the service provider or present, insert, swipe, tap or otherwise make available a debit, credit or ID card or other identifying apparatus which contains a user's unique ID to the service provider system for the system to retrieve the user's matching approval ID. Once a service provider obtains the user's approval ID through a public device (e.g., ATM 309, terminal or airline Kiosk 310), the process and the interaction methods between a service provider system, an authentication management server system through an accompanying approval app n a registered user device and the user at this moment may be identical to those described above with reference to FIGS. 29 and 30.

Figure 31:
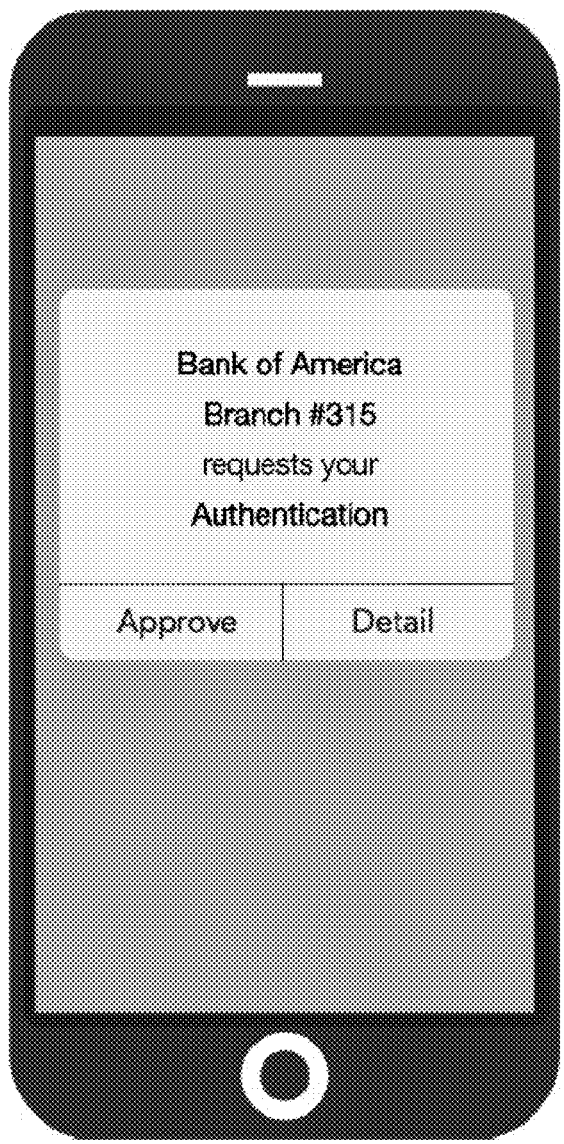
FIG. 31 is a screenshot of a device application user interface for authenticating a user in accordance with an embodiment of the disclosed system.
Figure 32:
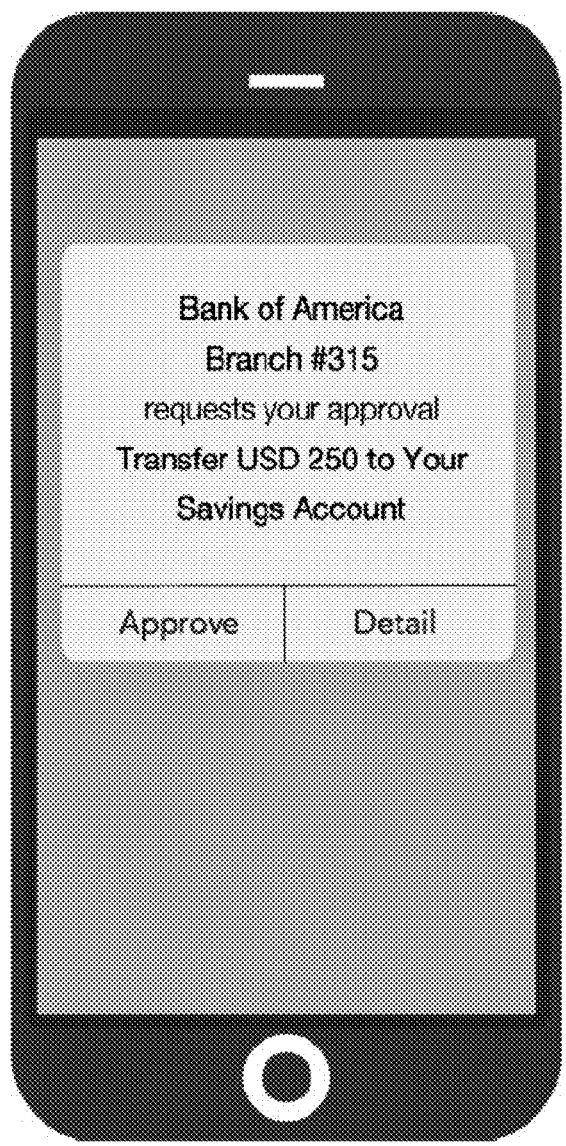
FIG. 32 is a screenshot of a device application user interface for granting approval for a specific action in accordance with an embodiment of the disclosed system.

In accordance with many embodiments, a user may visit a service provider's place of business such as a branch office 307 or local store. An exemplary authentication process in this kind of situation may comprise the following steps. A user may approach a representative of the service provider over the counter and present, insert, swipe, tap or otherwise make available a debit, credit or ID card or other identifying apparatus which contains a user's unique ID to the service provider for the service provider system to retrieve a user's matching approval ID. Once a service provider system obtains the user's ID associated with the authentication management server, the process and the interaction methods between a service provider system, an authentication management server through an accompanying approval app on a registered user device and a user at this moment may be identical to the processes described above with reference to FIGS. 31 and 32.

In accordance with a number of embodiments, the following steps illustrate how a user may set up a new device in case the registered primary device is lost, stolen or otherwise compromised using a similar device to device authentication method described in FIG. 12. The user of the lost registered primary device can follow the steps illustrated in FIG. 7 to download, install, and run the approval app on a new device (e.g., a new smart phone) which the user intends to register. On the approval app's user interface on the new device, the user can click on "Already have an account" option 1102 and enter his existing approval ID. The approval app, after communicating with the authentication management server, can confirm the existing ID and further display that the current device is not registered as the "trusted device" and provide the user with possible three options to proceed. (FIG. 10) Option 1: Register this device using one of the primary devices 1001. Option 2: Register this device using other registered devices 1002. Option 3: Register this device using the password 1003.

Figure 15:
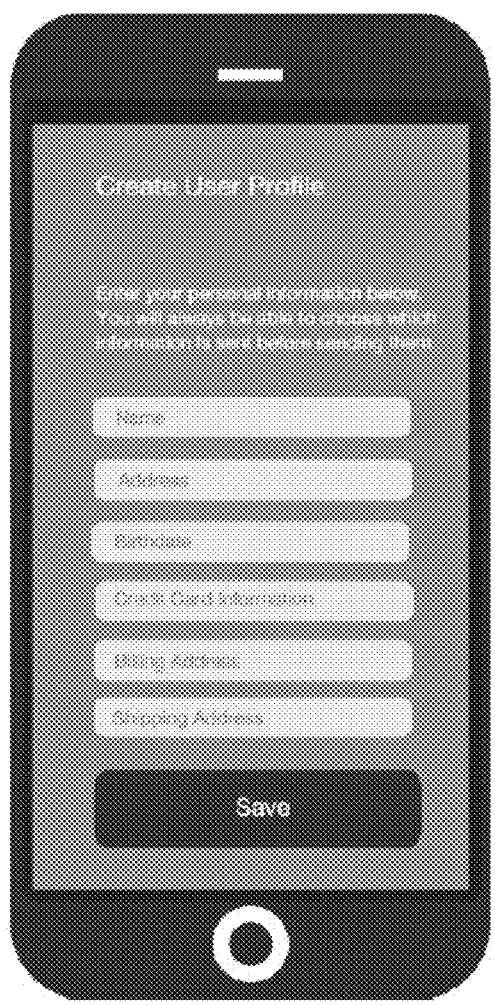
FIG. 15 is a screenshot of a device application user interface for creating a new user profile in accordance with an embodiment of the disclosed system.

The user may not wish to use Option 1. 1001 since the primary registered user device is either lost, stolen, or compromised. Therefore, the user cannot grant approval when the request is pushed by the authentication management server through the approval app. When the user clicks on Option 2 1102, the authentication management server communicates with the user by transmitting a request (to register a new user device) for approval via push notification function of the approval app on the other registered user device(s) 1008 instead of his primary device FIG. 15. The user can review and approve the request from the authentication management server on other registered user devices 305 (e.g., an iPad or tablet PC) if it is legitimate and the user wishes to proceed 707. Alternatively, the user may ask the entrusted user who was added as an additional user as described above so the other user can approve the request on a user device registered to the additional user when the request from the authentication management server is pushed on to the registered user device of the additional user. The authentication management server then registers the new user device under the user's approval ID 1011. Once the new user device is successfully registered, the user may use the new user device to access the setting of the approval app on the new device to remove lost, stolen or otherwise compromised device and/or to list the new device as a primary device. Any person who is not in possession of the registered user device or who cannot unlock the user device even if the user device is in his possession cannot grant (or refuse) approval.

If an unauthorized person attempts to use the approval ID of another user without the registered device, the attempt will fail because the unauthorized person does not have the registered user device to approve the request sent by the authentication management server. Moreover, the registered user with the registered primary user device will be notified in real time since the push notification will seek his approval on a primary user device where a user can easily refuse or report unusual activity. If an unauthorized person attempts to use the approval ID of another user with a stolen registered user device, the attempt will fail because the unauthorized user does not have the requisite biometric data to unlock the registered device, which has been previously set up by the registered user.

The term "authentication" as used herein is intended to include passwords, passcodes, or other authentication credentials. A registered user may be required to submit or, more generally, any other action that a user may be required to perform in order to gain access to an access-controlled system or to authorize a specific transaction to take a place.

It should be again emphasized that all embodiments which have been described herein are provided by way of illustration only and should not be construed as limiting. All embodiments herein may be combined in all possible combinations with each other. Although examples are described in detail herein with reference to the accompanying drawings, it is to be understood that the examples are not limited to those precise descriptions and illustrations. As such, many modifications and variations will be apparent to those of ordinary skill in the art. Accordingly, it is contemplated that a feature described either individually or in part of an example can be combined with other individually described features, or parts of other examples, even if the other features and examples make no mentioned of the feature.

What is claimed is:

1. A method for authenticating a user for a service provider system comprising:
   (1) receiving a request for access to a service from a user-operated computing device by a service provider system;
   (2) in response to step (1), receiving a request to authenticate the user from the service provider system by an authentication management system;
   (3) in response to step (2), transmitting an authentication request from the authentication management system to a registered computing device associated with the user;
   (4) in response to step (3), receiving an authentication confirmation from the registered computing device by the authentication management system;
   (5) in response to step (4), transmitting an authentication verification to the service provider system by the authentication management system; and
   (6) in response to step (5), providing the user-operated computing device access to the service by the service provider system.

2. The method of claim 1 further comprising:
   maintaining a user database in the authentication management system that stores a plurality of user records wherein each of the plurality of user records includes a user identification, a list of registered devices associated with the user, a list of service providers associated with the user, and authentication information for each service provider in the list of service providers.

3. The method of claim 2 wherein the request to authenticate the user in step (2) includes the user identification.

4. The method of claim 3 further comprising:
   determining the registered computing device to receive the authentication request in step (3) using the list of registered devices in a user record from the plurality of users records that is associated with the user identification in the authentication request.

5. The method of claim 4 wherein authentication verification in step (5) includes authentication information of the user for the service provider and the method further comprises retrieving the authentication information for the service provider from the user record associated with the user in response to the authentication information.

6. The method of claim 2 further comprising:
   receiving a request from a new user device to add the new user device to the list of registered devices of the user in the authentication management system;
   transmitting a new device confirmation from the authentication management system to a registered computing device of the user;
   receiving a new device authorization from the registered computing device of the user in the authentication management system; and
   adding the new user device to the list of registered devices in the user record associated with the user using the authentication management system.

7. The method of claim 2 further comprising:
   receiving a request to add a new service provider for the user from a registered computing device associated with the user in the authentication management system;
   obtaining authentication information for the new service provider using the authentication management system;
   transmitting the user identification of the user and the obtained authentication information for the new service provider to the service provider system from the authentication management system to store for later use; and
   adding the new service provider and the authentication information for the new service provider to the user record associated with the user.

8. The method of claim 7 wherein the obtaining of the authentication information for the new service provider comprises receiving a user input password from the registered computing device.

9. The method of claim 7 wherein the obtaining of the authentication information for the new service provider comprises generating the authentication information using a random generating process.

10. The method of claim 1 further comprising:
    performing an authentication process on the registered device prior to step (5) transmitting the authentication confirmation from the registered device.

11. The method of claim 1 further comprising:
    receiving a request from a service provider system to take a specific action regarding an account of the user by the authentication management system;
    transmitting an authorization request for the requested specific action from the authentication management system to a registered computing device associated with the user;
    receiving an authorization confirmation back from the registered computing device in the authentication management system; and
    transmitting an authorization message for the specific action from the authentication management system to the service provider system in response to receiving the authorization confirmation from the registered computing device.

12. The method of claim 11 further comprises:
    transmitting information relating to the requested specific action from the authentication management system to the registered computing device.

13. The method of claim 12 further comprising:
    displaying the information relating to the requested specific action on a display of the registered computing device.

14. The method of claim 1 comprising:
    pushing the authentication request in step (3) from the authentication management system to a display of the registered computing device.

15. A system for authenticating a user for a service provider system comprising:
    an authentication management system comprising:
       one or more processors;

a non-transitory media readable by the one or more processors; and instructions stored in the non-transitory media that when read by the one or more processors direct the one or more processors to:

receive a request to authenticate a user from a service provider system in response to the service provider receiving a request for access from a user;

transmit an authentication request to a registered computing device associated with the user;

receive an authentication confirmation from the registered computing device; and transmit an authentication verification to service provider system in response to receiving the authentication confirmation from the registered computing device, thereby authorizing the service provider to provide access by the user to the requested service.

16. The system of claim 15 wherein the instructions further direct the one or more processor to maintain a user database in a memory system of the authentication management system that stores a plurality of user records wherein each of the plurality of user records includes a user identification, a list of registered computing devices associated with the user, a list of service providers associated with the user, and authentication information for each service provider in the list of service providers.

17. The system of claim 15 further comprising:

instructions stored on a non-transitory media readable by a processor in a user computing device, the instructions directing the processor in the user device to:

receive the authentication request from the authentication management system, present the request on a display of the user computing device, receive an input from a user confirming the authentication, and transmit the authentication confirmation to the authentication management system in response to receiving the user input.

18. The system of claim 17 wherein the instructions stored in the non-transitory media in the user computing device require an authentication process for unlocking the user computing device be active.

19. The system of claim 15 further comprising:

instructions stored on a non-transitory media readable by one or more processors in a service provider system that when read by the one or more processors direct the one or more processors to:

receive a request for access from a user from a computing device associated with the user transmit the request to authenticate the user to the authentication management system, receive the authentication verification from the authentication management system; and allow the computing device associated with the user to access a provided service in response to receiving the authentication verification.

20. The method of claim 1, wherein the user-operated computing device in steps (1) and (6) is the same as the registered device in steps (3) and (4).

21. The method of claim 1, wherein the user-operated computing device in steps (1) and (6) is a different device from the registered device in steps (3) and (4).

* * * * *